United States Patent
Kato et al.

(10) Patent No.: US 11,855,570 B2
(45) Date of Patent: Dec. 26, 2023

(54) MOTOR DEVICE

(71) Applicant: Mitsubishi Electric Corporation, Tokyo (JP)

(72) Inventors: Kenji Kato, Tokyo (JP); Hideaki Arita, Tokyo (JP); Taiga Komatsu, Tokyo (JP); Yuki Hidaka, Tokyo (JP); Shohei Fujikura, Tokyo (JP); Hiroyuki Higashino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 266 days.

(21) Appl. No.: 17/600,124

(22) PCT Filed: Jun. 3, 2019

(86) PCT No.: PCT/JP2019/021924
§ 371 (c)(1),
(2) Date: Sep. 30, 2021

(87) PCT Pub. No.: WO2020/245861
PCT Pub. Date: Dec. 10, 2020

(65) Prior Publication Data
US 2022/0173689 A1    Jun. 2, 2022

(51) Int. Cl.
*H02P 29/60*    (2016.01)
*H02K 9/22*    (2006.01)

(52) U.S. Cl.
CPC .............. *H02P 29/60* (2016.02); *H02K 9/22* (2013.01); *H02K 2213/03* (2013.01)

(58) Field of Classification Search
CPC .................. H02P 29/60; H02K 9/22
See application file for complete search history.

(56) References Cited

U.S. PATENT DOCUMENTS 9,112,444 B2 *  8/2015  Dedrich ................. H02P 29/66
10,340,774 B2 *  7/2019  Sugimoto ............... H02P 29/60
(Continued)

FOREIGN PATENT DOCUMENTS

JP    2014-36475 A    2/2014
JP    2014-93867 A    5/2014

OTHER PUBLICATIONS

International Search Report and Written Opinion dated Sep. 3, 2019, received for PCT Application PCT/JP2019/021924, Filed on Jun. 3, 2019, 8 pages including English Translation.

*Primary Examiner* — Thai T Dinh
(74) *Attorney, Agent, or Firm* — XSENSUS LLP

(57) ABSTRACT

This motor device includes: a motor having components including a stator and a rotor; and a controlling circuitry to control the motor. The motor is provided with temperature sensors to detect a heat transfer amount and a transfer direction about the components. The controlling circuitry includes a temperature calculator to calculate a component temperature based on a thermal circuit network from thermal resistances and heat capacities given for the components. On the basis of actual measured values of the heat transfer amount and the transfer direction obtained by the temperature sensors, the temperature calculator corrects thermal resistances and heat capacities about the components obtained on the basis of the thermal circuit network, and estimates the temperature of each component during driving of the motor.

8 Claims, 29 Drawing Sheets

(56) References Cited

U.S. PATENT DOCUMENTS

| | | | |
|---|---|---|---|
| 2009/0108785 A1* | 4/2009 | Takada | H02P 6/17 318/400.38 |
| 2010/0231155 A1* | 9/2010 | Schmidt | G01K 13/00 318/473 |
| 2014/0126606 A1 | 5/2014 | Ito et al. | |

* cited by examiner

MOTOR DEVICE

CROSS-REFERENCE TO RELATED APPLICATION

The present application is based on PCT filing PCT/JP2019/021924, filed Jun. 3, 2019, the entire contents of which are incorporated herein by reference.

TECHNICAL FIELD

The present disclosure relates to a motor device that estimates the temperature inside a motor.

BACKGROUND ART

A conventional motor device estimates the temperature of each component of a motor, using detection signals from a plurality of temperature sensors (for example, Patent Document 1).

CITATION LIST

Patent Document

Patent Document 1: Japanese Laid-Open Patent Publication No. 2014-36475

SUMMARY OF THE INVENTION

Problems to be Solved by the Invention

In the conventional motor device, the temperature of each part is estimated using a thermal circuit network and temperatures detected by temperature sensors attached to some components. Therefore, the heat transfer amount between adjacent components cannot be accurately estimated, and thus there is a problem that temperature estimation accuracy is not high.

The present disclosure has been made to solve the above problem, and an object of the present disclosure is to provide a motor device that can accurately estimate the temperature of a component composing a motor and thus can improve temperature estimation accuracy.

Solution to the Problems

A motor device according to the present disclosure includes: a motor having a plurality of components including a stator and a rotor; and a control device for controlling the motor. The motor is provided with a sensor for detecting a heat transfer amount and a heat transfer direction with respect to the components composing the motor. The control device includes a temperature calculation unit for calculating a temperature of each component on the basis of a thermal circuit network from thermal resistances and heat capacities given with respect to the components. On the basis of actual measured values of the heat transfer amount and the heat transfer direction obtained by the sensor, the temperature calculation unit corrects thermal resistances and heat capacities with respect to the components obtained on the basis of the thermal circuit network, and estimates the temperature of each component composing the motor.

Effect of the Invention

In the motor device according to the present disclosure, the heat transfer amount and the heat transfer direction with respect to the components composing the motor are directly detected by the sensor, and on the basis of the actual measured values, the heat transfer amount and the heat transfer direction of the components calculated in advance from the thermal circuit network are corrected, whereby the temperatures of the components composing the motor can be accurately estimated, thus enabling improvement in temperature estimation accuracy.

DESCRIPTION OF EMBODIMENTS

Embodiment 1

Figure 1:
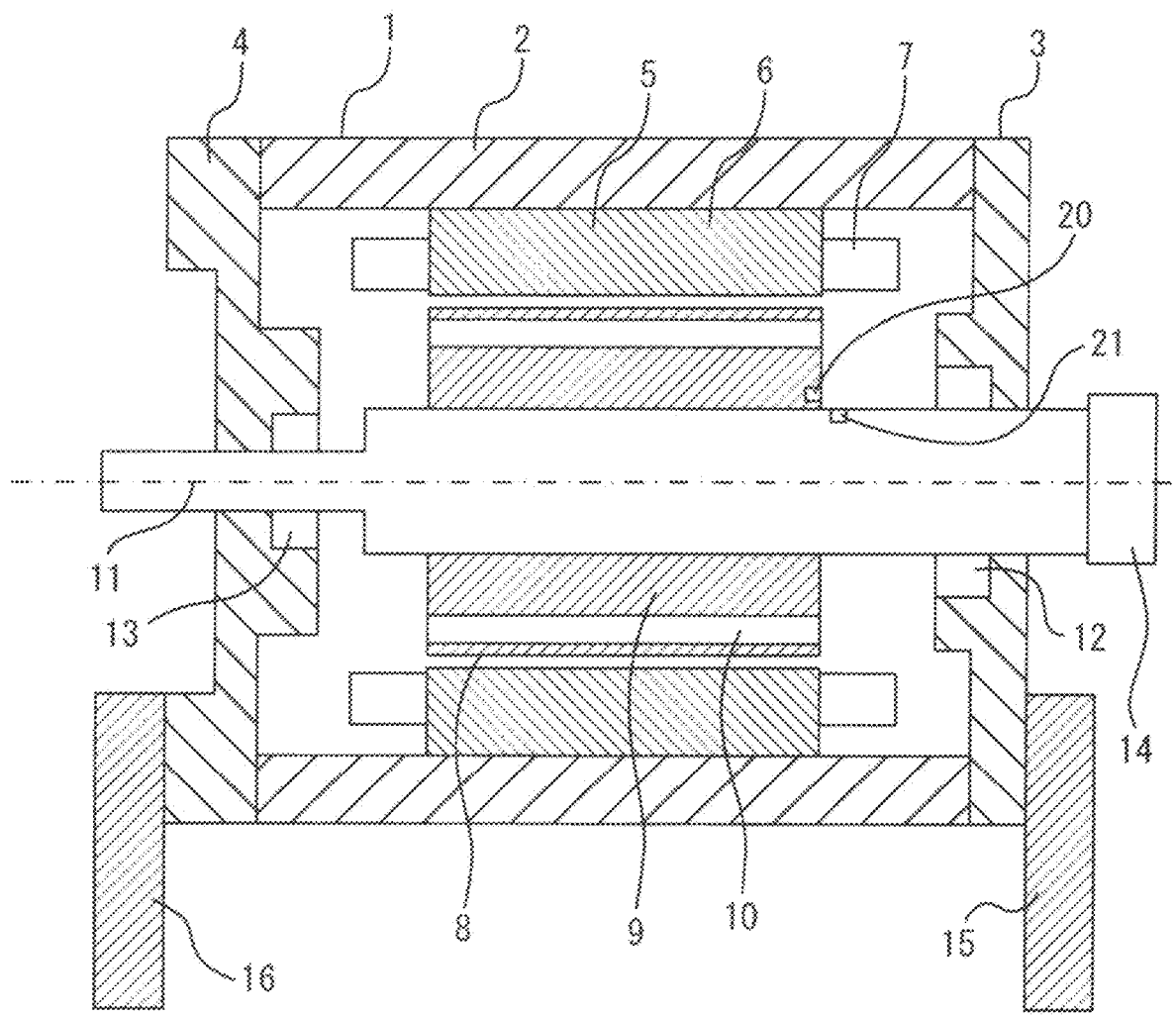
FIG. 1 is a sectional view showing a motor according to embodiment 1 of the present disclosure.
Figure 2:
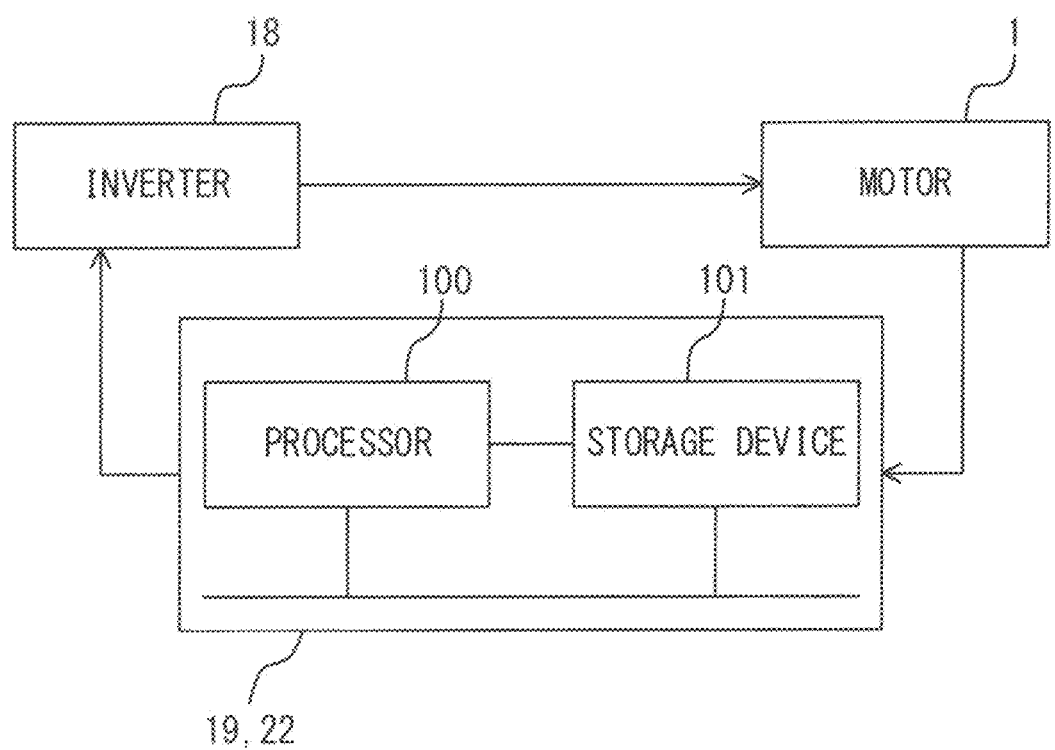
FIG. 2 is a configuration diagram showing a control system of a motor device according to embodiment 1 of the present disclosure.
Figure 3:
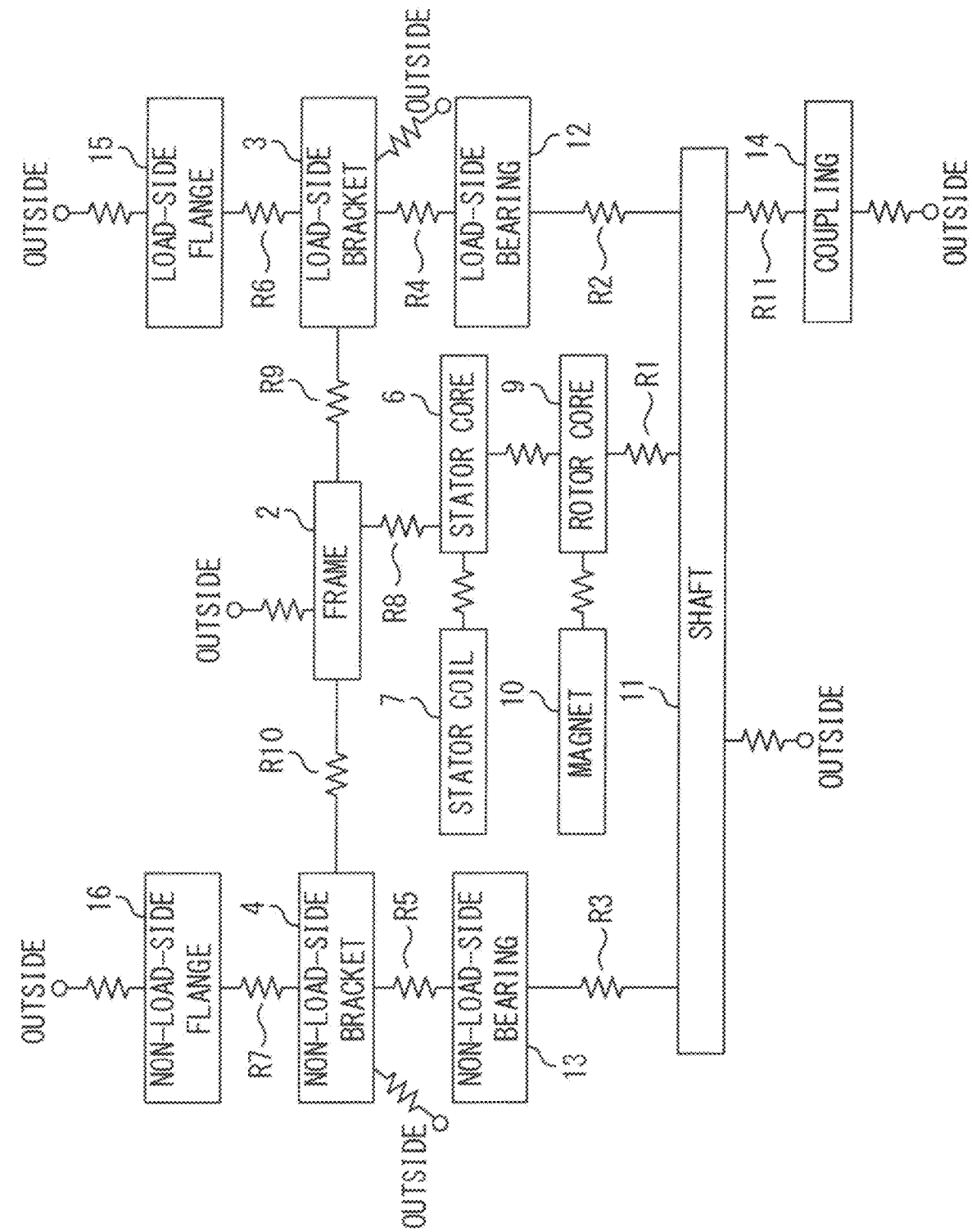
FIG. 3 is a schematic diagram of a thermal circuit network according to embodiment 1 of the present disclosure.

FIG. 1 is a sectional view showing a motor according to embodiment 1 of the present disclosure. FIG. 2 is a configuration diagram showing a control system of a motor device provided with the motor shown in FIG. 1. FIG. 3 is a schematic diagram of a thermal circuit network incorporated in a temperature calculation unit of a control device and used for calculating a temperature distribution inside the motor.

As shown in FIG. 1, a motor 1 has a columnar rotor 8 and a cylindrical stator 5 surrounding the circumference of the rotor 8. In this example, a stator core 6 forming the stator 5 is provided with a stator coil 7, and a rotor core 9 forming the rotor 8 is provided with a magnet 10.

At locations close to the contact surface between the rotor core 9 and a shaft 11, two thermocouples 20, 21 are attached as temperature sensors. It is noted that the temperature sensors are not limited to the thermocouples 20, 21 as in embodiment 1, and for example, a resistance temperature detector, a thermistor, a pyroelectric sensor, or the like may be applied.

The stator 5 is fixed to the inner side of a cylindrical frame 2. The frame 2 is fixed to a load-side bracket 3 and a non-load-side bracket 4 by a plurality of bolts or the like, for example. The shaft 11 penetrates the load-side bracket 3 and the non-load-side bracket 4, in a state of being rotatably supported by a load-side bearing 12 and a non-load-side bearing 13 respectively provided to the load-side bracket 3 and the non-load-side bracket 4.

As shown in FIG. 2, the motor device has the motor 1 configured as described above, an inverter 18, and a control device 19. The inverter 18 controls the rotation speed and the torque of the motor 1 from the amplitude and the phase of current applied to the stator coil 7, on the basis of a command from the control device 19 described later. Then, through power supply from the inverter 18 to the stator coil 7, the rotor 8 rotates and motive power is transmitted to the outside via a coupling 14 provided at an end of the shaft 11 fixed at a center part of the rotor 8.

As shown in a schematic hardware configuration in FIG. 2, the control device 19 includes a processor 100 and a storage device 101. The storage device 101 includes a volatile storage device such as a random access memory, a nonvolatile auxiliary storage device such as a flash memory, a hard disk, and the like, although not shown. The processor 100 executes various programs inputted from the storage device 101. Thus, the control device 19 has a function of operating as a temperature calculation unit 22 for calculating the temperature of each component on the basis of the thermal circuit network from thermal resistances and heat capacities given with respect to the respective components composing the motor. Measurement values of temperatures measured by the thermocouples 20, 21 described above are inputted to the temperature calculation unit 22 of the control device 19. Here, the measurement data from the thermocouples 20, 21 are transmitted to the temperature calculation unit 22 of the control device 19, wirelessly, for example.

On the basis of the actual measured values of a heat transfer amount and a heat transfer direction obtained by the thermocouples 20, 21, the temperature calculation unit 22 of the control device 19 corrects the thermal resistances and the heat capacities with respect to the components obtained in advance on the basis of the thermal circuit network, and estimates the temperature of each component composing the motor. In this case, information about the thermal circuit network needed for estimating the temperature of each component composing the motor 1 is stored in advance in the storage device 101 (e.g., hard disk) provided to the control device 19, or the like.

Here, in the thermal circuit network shown in FIG. 3, where locations corresponding to estimation positions for the temperatures of the respective components are defined as nodes, the following expression is satisfied between a node i at a given location and N nodes j (j=1, 2, ..., N) connected to the node i.

[Mathematical 1]

$$C_i \frac{\partial T_i}{\partial t} = \sum_{j=1}^{N} \frac{1}{R_{ij}}(T_j - T_i) + Q_i \tag{1}$$

Here, Ci is the heat capacity at each node i, Ti is the temperature at each node i, t is time, Rij is the thermal resistance between two nodes i and j, and Qi is the heat generation amount at each node i. By simultaneously solving the above Expressions (1) for all the nodes i, it is possible to calculate the temperature Ti at each node i at each time t.

Regarding the value of each thermal resistance Rij shown in FIG. 3, the value between components contacting with each other is determined from the value of the contact thermal resistance, the value in a single component is determined from the thermal conductivity and the shape of the material, and the value for heat dissipation to the surrounding area from the motor 1 is determined from the motor shape and the convective heat transfer coefficient or radiation. The thermal resistance Rij is calculated from shapes in advance or measured actually, and then given to the thermal circuit network. In addition, the heat capacity Ci is a value determined from the shape and the specific heat, and this value is also given to the thermal circuit network in advance.

The temperature calculation unit 22 of the control device 19 calculates a temperature distribution inside the motor 1 on the basis of measurement values of the thermocouples 20 and 21, the thermal circuit network described above, and an amount Q (loss value) of heat generated inside the motor 1 calculated from the rotation speed or the value of current applied to the stator coil 7.

The control device 19 sends a current command to the inverter 18 so that the calculated temperatures T of the stator coil 7, the magnet 10, and the like do not exceed thresholds set in advance. Here, regarding the thresholds, for example, the threshold for the stator coil 7 is set to such a temperature that does not cause dielectric breakdown of the coil and the threshold for the magnet 10 is set to such a temperature that does not cause demagnetization of the magnet, with both thresholds set so as to include margins in consideration of temperature estimation error.

Operation of the motor device will be described.

With current inputted from the inverter 18 to the stator coil 7, the rotor 8 of the motor 1 rotates to transmit motive power to the outside via the coupling 14. At this time, loss is generated, e.g., due to the current flowing, copper loss is generated in the stator coil 7 and iron loss is generated in stacked electromagnetic steel sheets of the stator core 6 and the rotor core 9, and due to rotation of the rotor 8, mechanical loss is generated in the load-side bearing 12 and the non-load-side bearing 13. The generated loss becomes heat to transfer inside the motor 1, thus increasing the temperature at each part. Further, the heat having passed through each part is dissipated to the outside of the motor 1 from the frame 2, the load-side bracket 3, the non-load-side bracket 4, the shaft 11, the coupling 14, a load-side flange 15, a non-load-side flange 16, and the like, by heat conduction, convection, and radiation. It is noted that a cooling method for the frame 2 may be an air cooling type or a liquid cooling type.

In the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 provided at the rotor core 9 and the shaft 11, and a thermal resistance R1 between the rotor core 9 and the shaft 11. In addition, the heat transfer direction is determined from the magnitude relationship between the temperatures measured by the respective thermocouples 20, 21.

If error between the heat transfer amount between the stator core 6 and the shaft 11 calculated in a course of calculation for the temperature T based on the thermal circuit network, and the heat transfer amount calculated from the temperature measurement values, exceeds a threshold set in advance, or if the heat transfer direction differs between both cases, the temperature calculation unit 22 of the control device 19 corrects one or more of the thermal resistance $R_{ij}$, the heat capacity $C_i$, and the heat generation amount $Q_i$ so that the two heat transfer amounts and the two heat transfer directions respectively become the same, and thus calculates the temperature $T_i$ at each node i.

Thus, temperature estimation accuracy can be improved as compared to a case of estimating the temperature of each component such as a coil or a magnet by a thermal circuit network using, as an input value, a heat generation amount calculated on the basis of the value of current flowing through a motor as in conventional art. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 2

Figure 4:
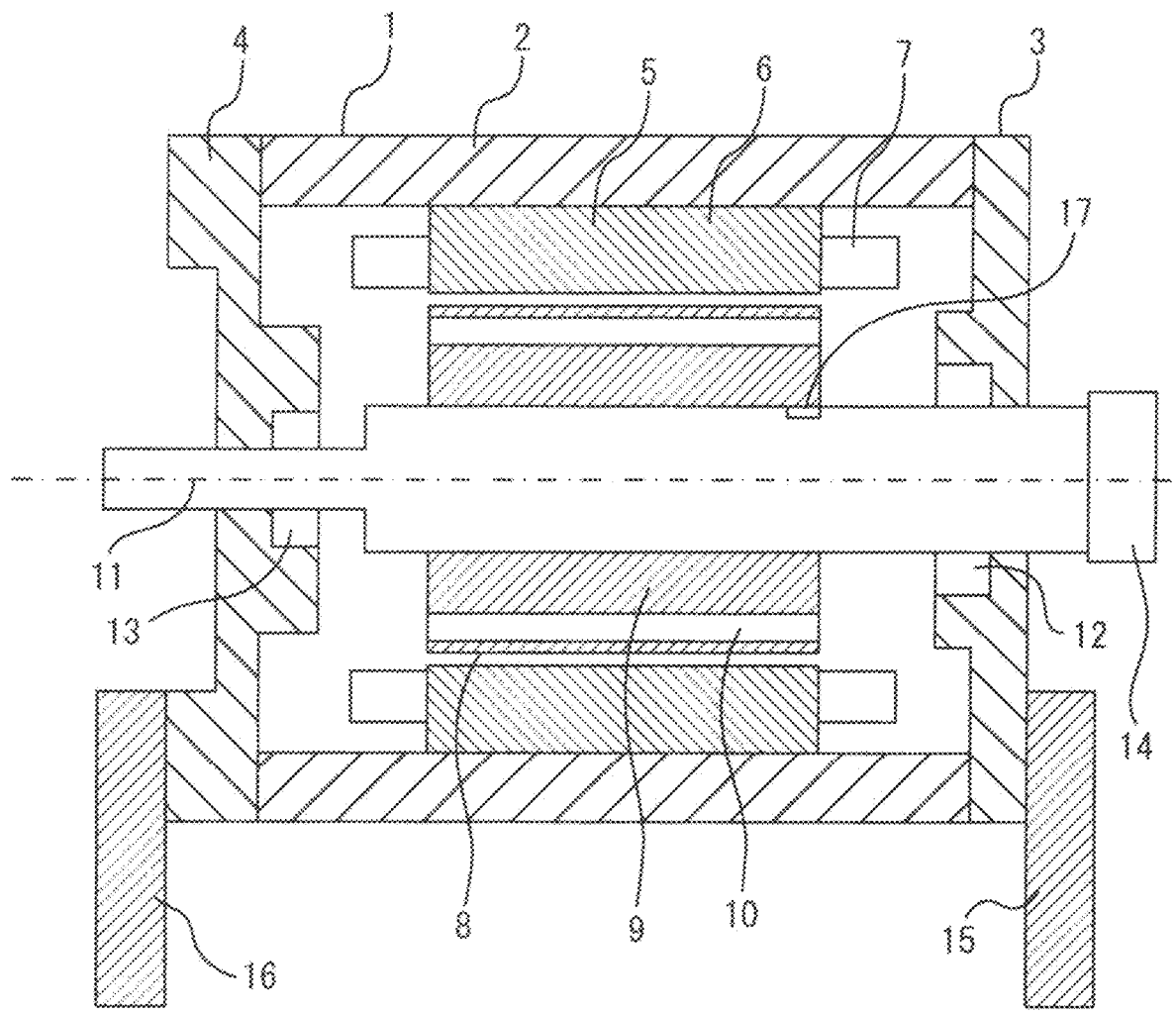
FIG. 4 is a sectional view showing a motor according to embodiment 2 of the present disclosure.

FIG. 4 is a sectional view showing a motor according to embodiment 2 of the present disclosure.

A heat flux sensor 17 is attached between the rotor core 9 and the shaft 11 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the heat transfer amount between the stator core 6 and the shaft 11 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance $R_{ij}$, the heat capacity $C_i$, and the heat generation amount $Q_i$ are corrected so that the two heat transfer amounts and the two heat transfer directions respectively become the same, and thus the temperature $T_i$ at each node i is calculated.

Thus, temperature estimation accuracy can be improved as compared to conventional art in which the temperature of a coil, a magnet, or the like is estimated from only temperature measurement values of some components.

Embodiment 3

Figure 5:
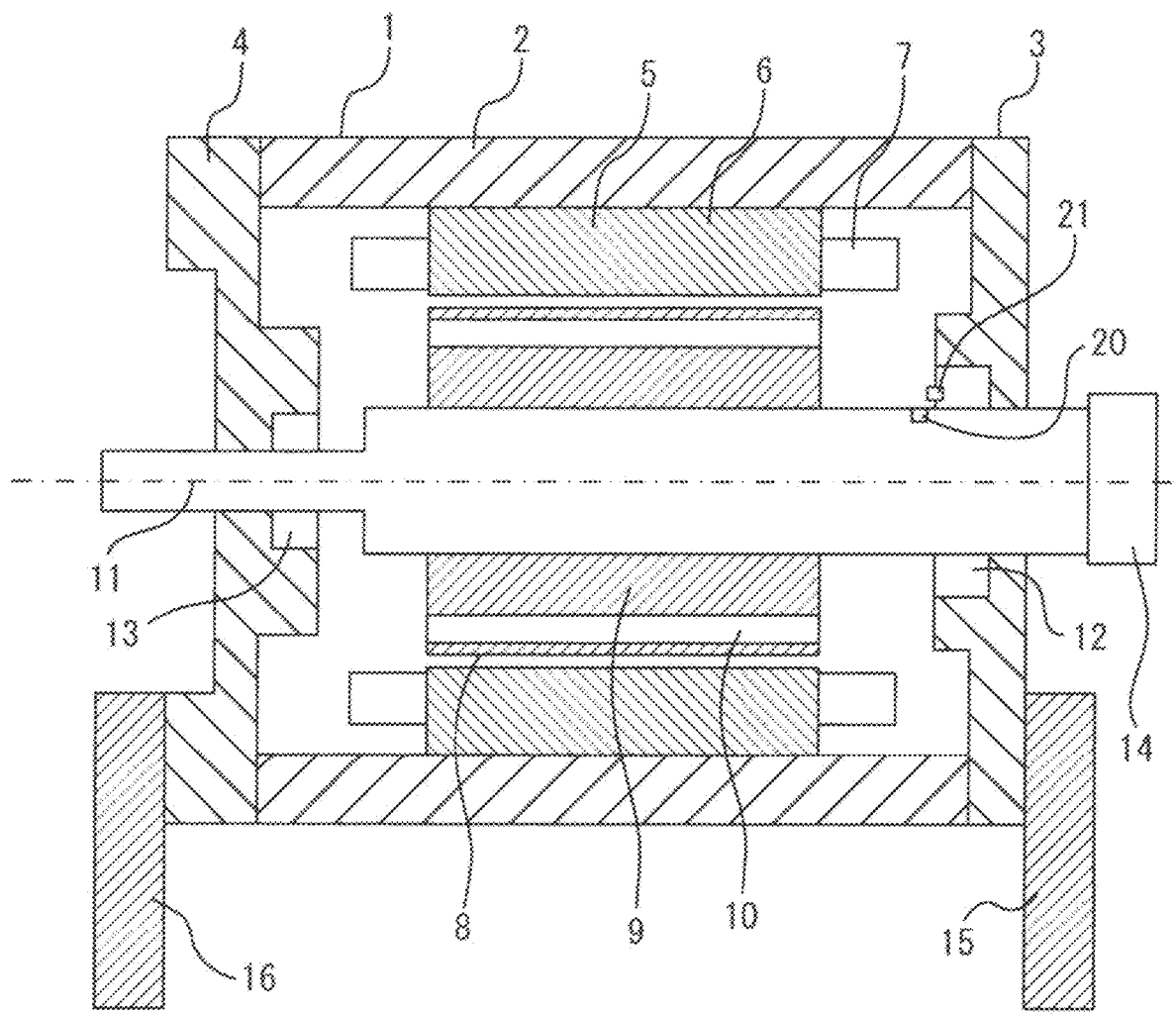
FIG. 5 is a sectional view showing a motor according to embodiment 3 of the present disclosure.

FIG. 5 is a sectional view showing a motor according to embodiment 3 of the present disclosure.

The thermocouples 20, 21 are respectively attached at locations close to the contact surface between the shaft 11 and the load-side bearing 12 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 provided at the shaft 11 and the load-side bearing 12, and a thermal resistance R2 between the shaft 11 and the load-side bearing 12. In addition, the heat transfer direction is determined from the magnitude relationship between the temperatures measured by the respective thermocouples 20, 21.

In the temperature calculation unit 22 of the control device 19, if error between the heat transfer amount between the shaft 11 and the load-side bearing 12 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance $R_{ij}$, the heat capacity $C_i$, and the heat generation amount $Q_i$ are corrected so that the two heat transfer amounts and the two heat transfer directions respectively become the same, and thus the temperature $T_i$ at each node i is calculated.

Thus, temperature estimation accuracy can be improved as compared to conventional art in which the temperature of a coil, a magnet, or the like is estimated from only temperature measurement values of some components. In particular, since it is difficult to accurately calculate mechanical loss generated in the bearing, this configuration is effective for correcting the heat generation amount due to mechanical loss. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 3, the thermocouples 20, 21 are respectively provided at locations close to the contact surface between the load-side bearing 12 and the shaft 11. However, the thermocouples 20, 21 may be respectively provided at locations close to the contact surface between the non-load-side bearing 13 and the shaft 11.

Embodiment 4

Figure 6:
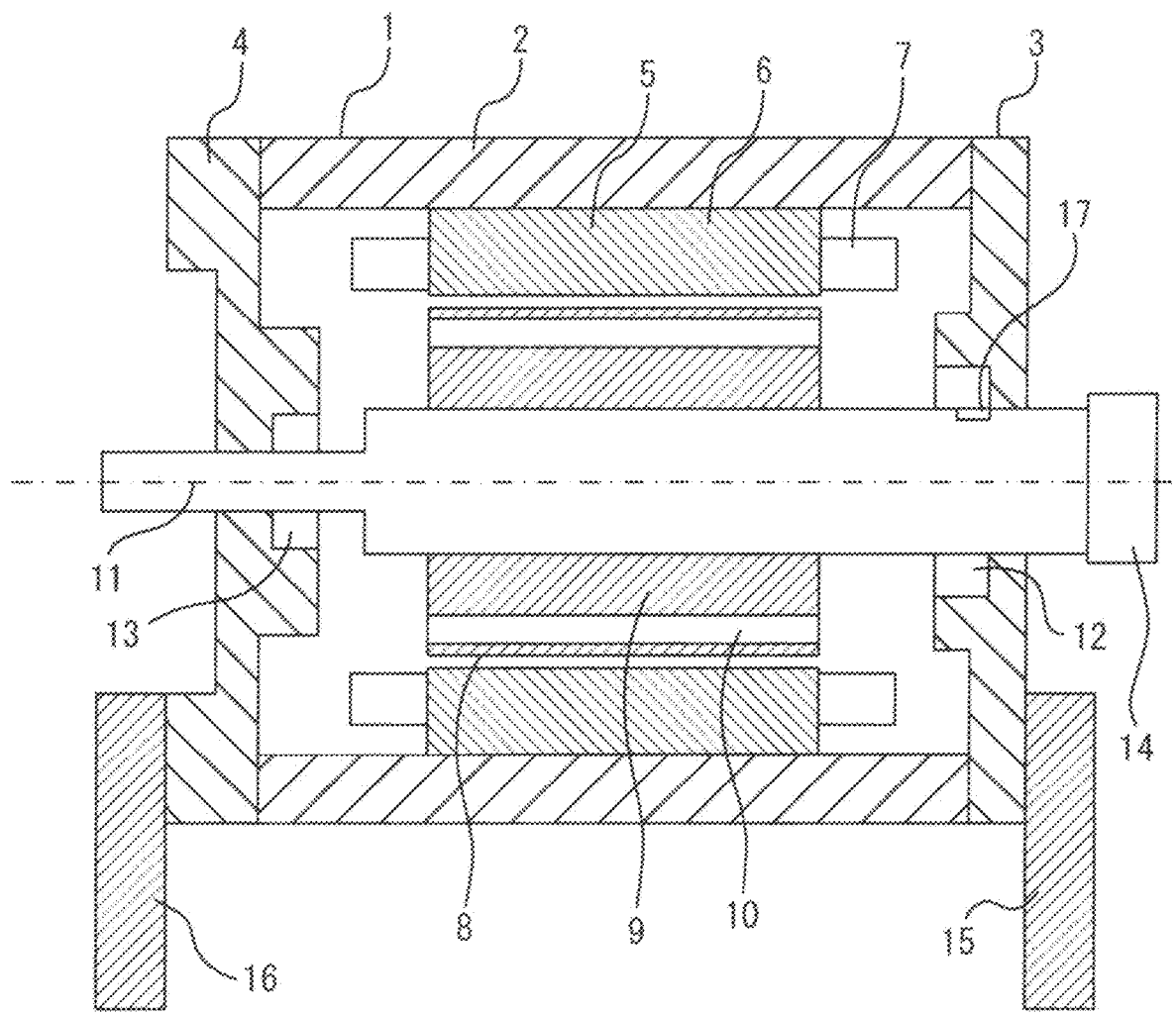
FIG. 6 is a sectional view showing a motor according to embodiment 4 of the present disclosure.

FIG. 6 is a sectional view showing a motor according to embodiment 4 of the present disclosure.

The heat flux sensor 17 is attached between the shaft 11 and the load-side bearing 12 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the heat transfer amount between the shaft 11 and the load-side bearing 12 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. In particular, since it is difficult to accurately calculate mechanical loss generated in the bearing, this configuration is effective for correcting the heat generation amount due to mechanical loss.

Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 4, the heat flux sensor 17 is provided between the load-side bearing 12 and the shaft 11. However, the heat flux sensor 17 may be provided between the non-load-side bearing 13 and the shaft 11.

Embodiment 5

Figure 7:
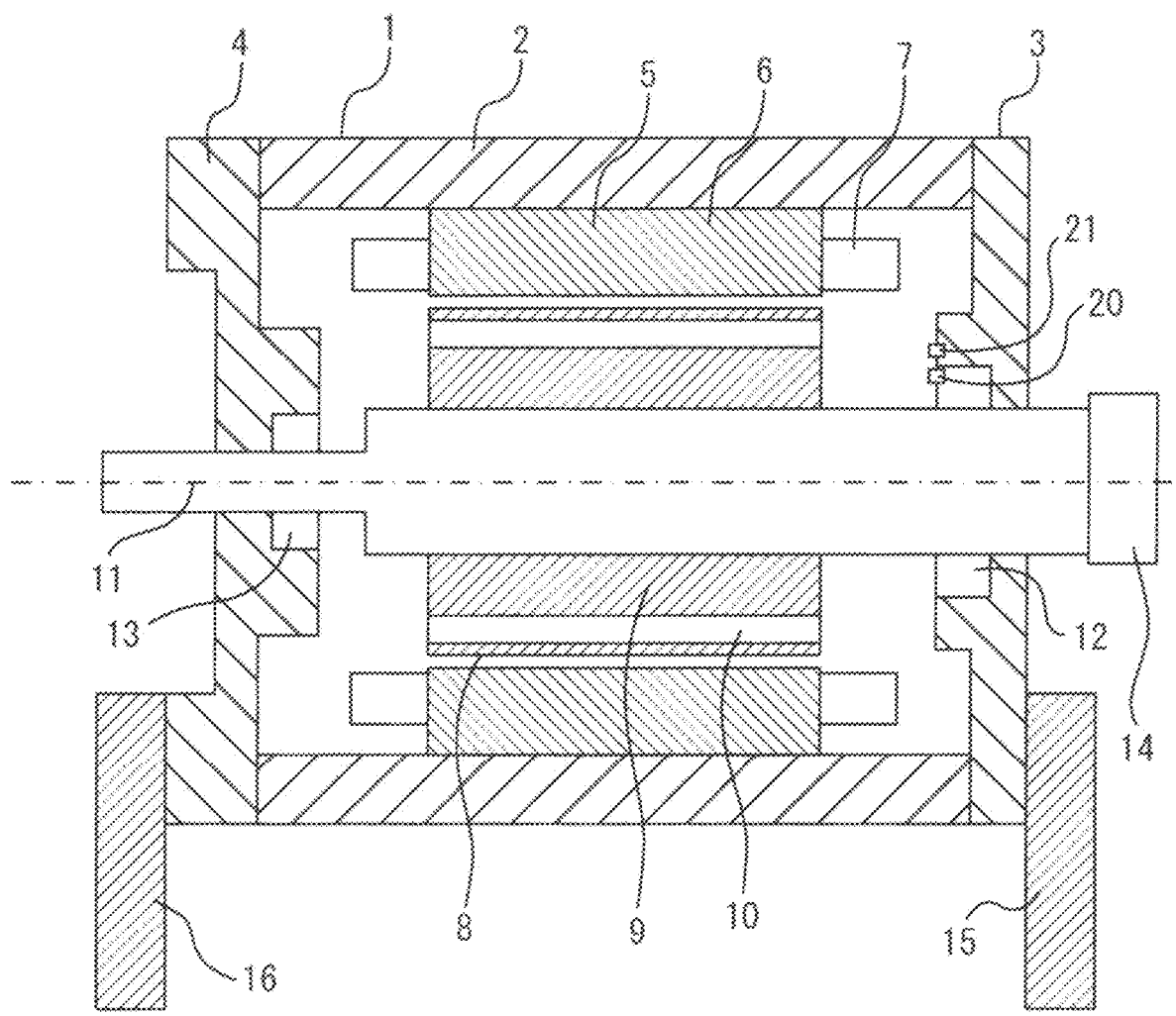
FIG. 7 is a sectional view showing a motor according to embodiment 5 of the present disclosure.

FIG. 7 is a sectional view showing a motor according to embodiment 5 of the present disclosure.

The thermocouples 20, 21 are respectively attached at locations close to the contact surface between the load-side bearing 12 and the load-side bracket 3 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 provided at the load-side bearing 12 and the load-side bracket 3, and a thermal resistance R4 between the load-side bearing 12 and the load-side bracket 3. In addition, the heat transfer direction is determined from the magnitude relationship between the temperatures measured by the thermocouple 20 and the thermocouple 21.

In the temperature calculation unit 22 of the control device 19, if error between the heat transfer amount between the load-side bearing 12 and the load-side bracket 3 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. In particular, since it is difficult to accurately calculate mechanical loss generated in the bearing, this configuration is effective for correcting the heat generation amount due to mechanical loss.

Owing to improvement in temperature estimation accuracy, it becomes possible to reduce temperature margins taken into consideration in setting of the temperature thresholds when a current command is sent from the control device 19 to the inverter 18, and thus the limit of operation of the motor 1 can be expanded.

In embodiment 5, the thermocouples 20, 21 are respectively provided at locations close to the contact surface between the load-side bearing 12 and the load-side bracket 3. However, the thermocouples 20, 21 may be respectively provided at locations close to the contact surface between the non-load-side bearing 13 and the non-load-side bracket 4.

Embodiment 6

Figure 8:
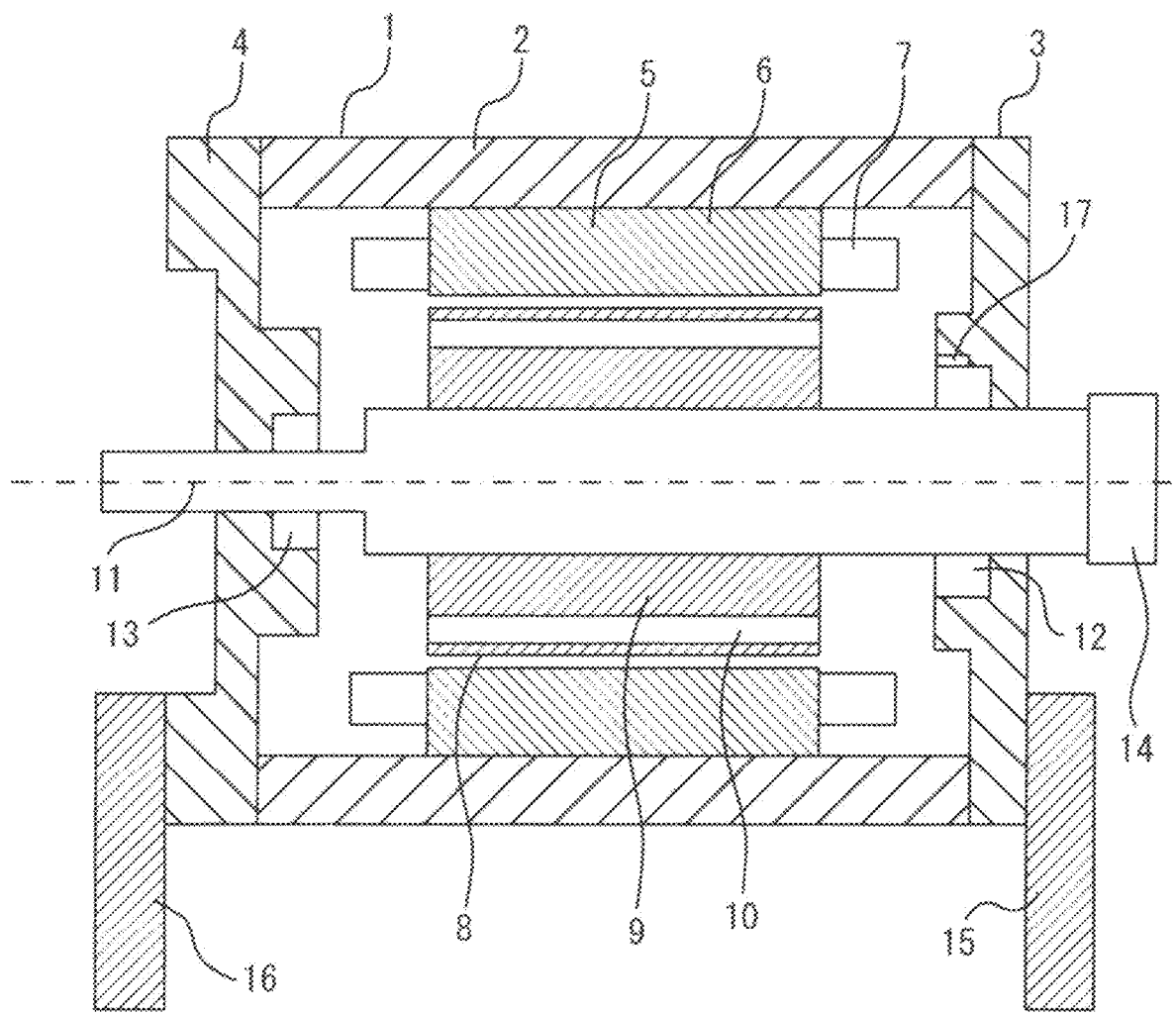
FIG. 8 is a sectional view showing a motor according to embodiment 6 of the present disclosure.

FIG. 8 is a sectional view showing a motor according to embodiment 6 of the present disclosure.

The heat flux sensor 17 is attached between the load-side bearing 12 and the load-side bracket 3 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the heat transfer amount between the load-side bearing 12 and the load-side bracket 3 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. In particular, since it is difficult to accurately calculate mechanical loss generated in the bearing, this configuration is effective for correcting the heat generation amount due to mechanical loss.

Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 6, the heat flux sensor 17 is provided between the load-side bearing 12 and the load-side bracket 3. However, the heat flux sensor 17 may be provided between the non-load-side bearing 13 and the non-load-side bracket 4.

Embodiment 7

Figure 9:
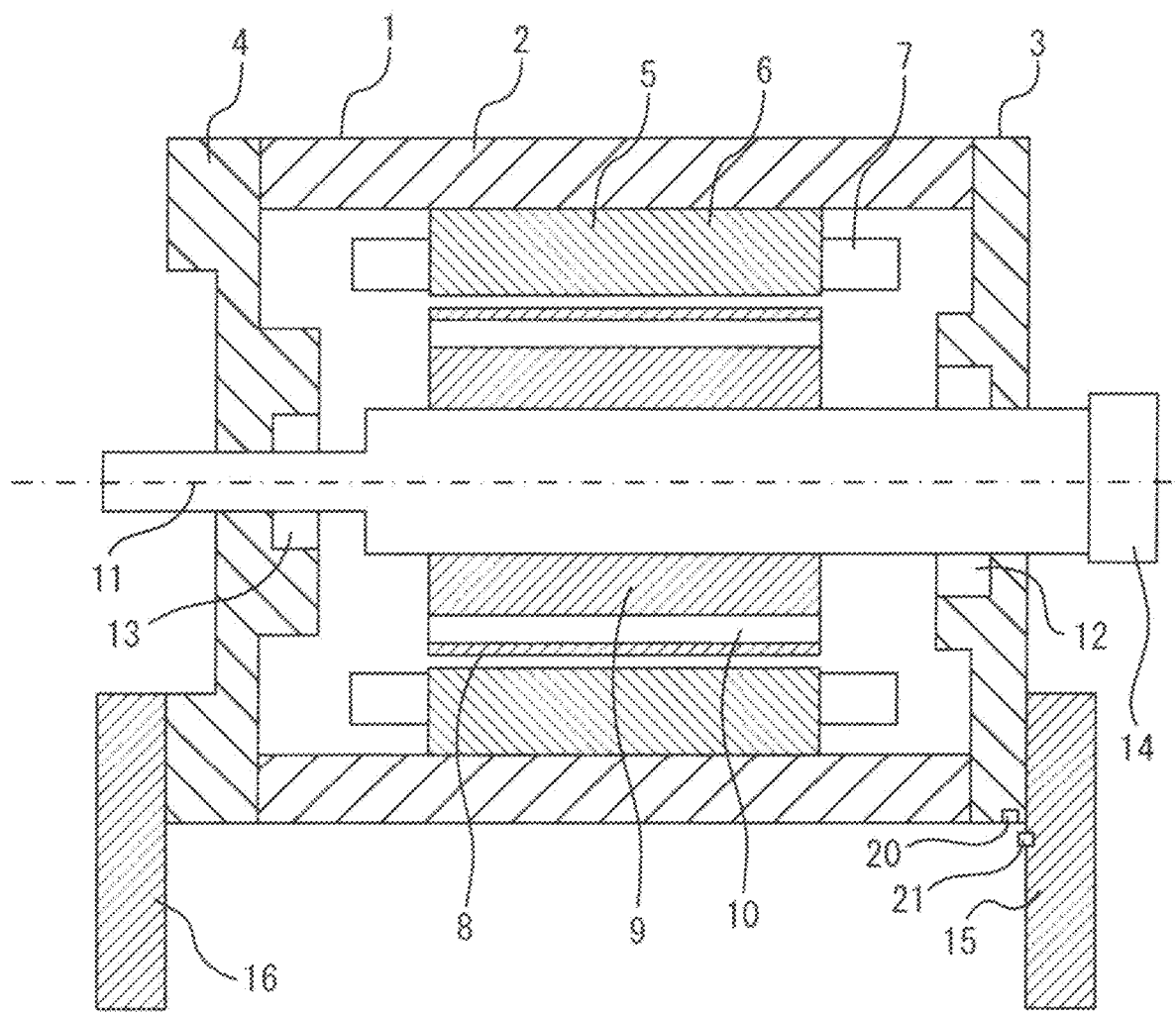
FIG. 9 is a sectional view showing a motor according to embodiment 7 of the present disclosure.

FIG. 9 is a sectional view showing a motor according to embodiment 7 of the present disclosure.

The two thermocouples 20, 21 are attached at locations close to the contact surface between the load-side bracket 3 and the load-side flange 15 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the thermocouples 20, 21 at the load-side bracket 3 and the load-side flange 15, and a thermal resistance R6 between the load-side bracket 3 and the load-side flange 15. In addition, the heat transfer direction is determined from the magnitude relationship between the temperatures measured by the thermocouple 20 and the thermocouple 21.

In the temperature calculation unit 22 of the control device 19, if error between the heat transfer amount between the load-side bracket 3 and the load-side flange 15 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 7, the thermocouples 20, 21 are respectively provided at locations close to the contact surface between the load-side bracket 3 and the load-side flange 15. However, the thermocouples 20, 21 may be respectively provided at locations close to the contact surface between the non-load-side bracket 4 and the load-side flange 16.

Embodiment 8

Figure 10:
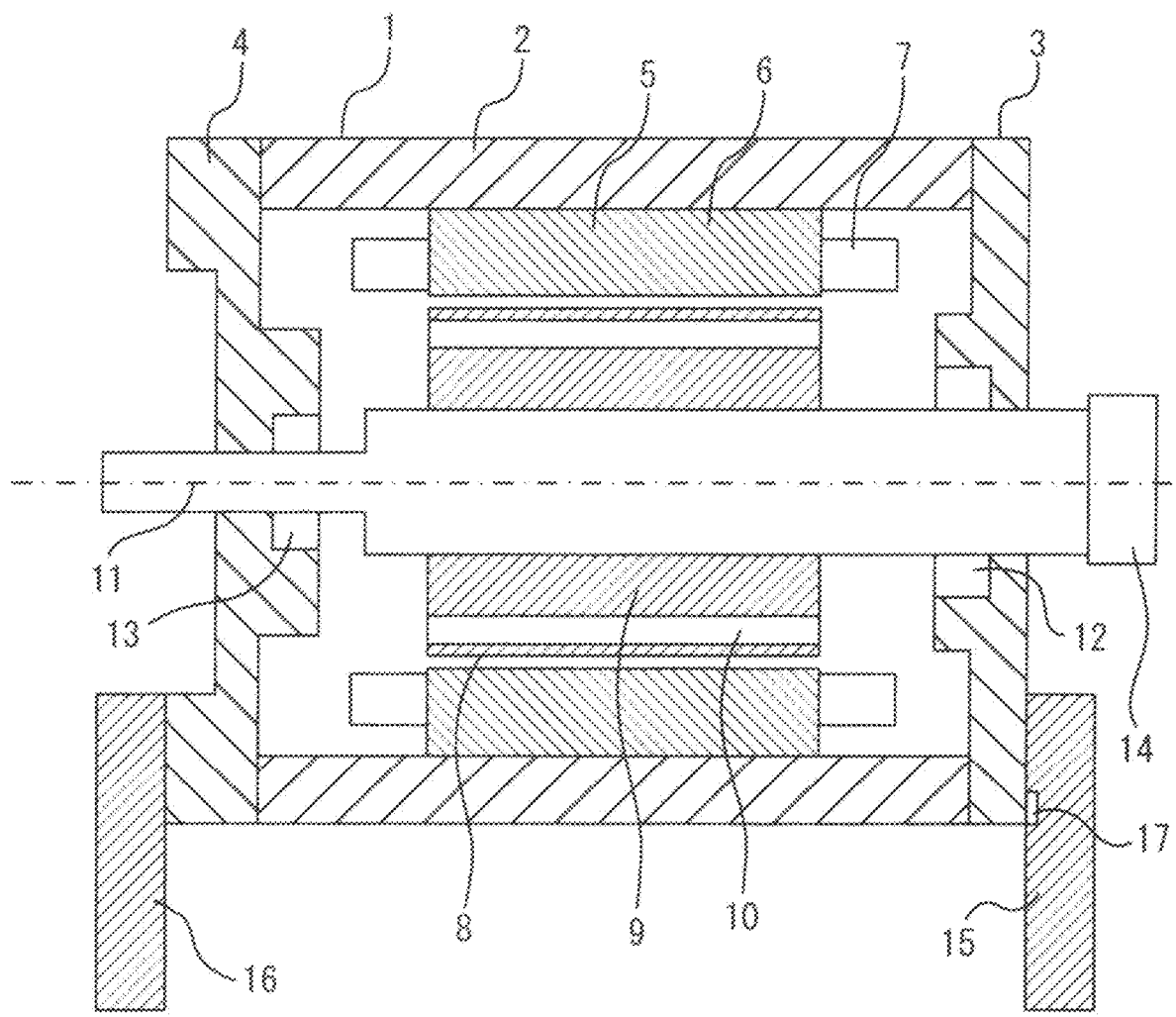
FIG. 10 is a sectional view showing a motor according to embodiment 8 of the present disclosure.

FIG. 10 is a sectional view showing a motor according to embodiment 8 of the present disclosure.

The heat flux sensor 17 is attached between the load-side bracket 3 and the load-side flange 15 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the heat transfer amount between the load-side bracket 3 and the load-side flange 15 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 8, the heat flux sensor 17 is provided between the load-side bracket 3 and the load-side flange 15. However, the heat flux sensor 17 may be provided between the non-load-side bracket 4 and the non-load-side flange 16.

Embodiment 9

Figure 11:
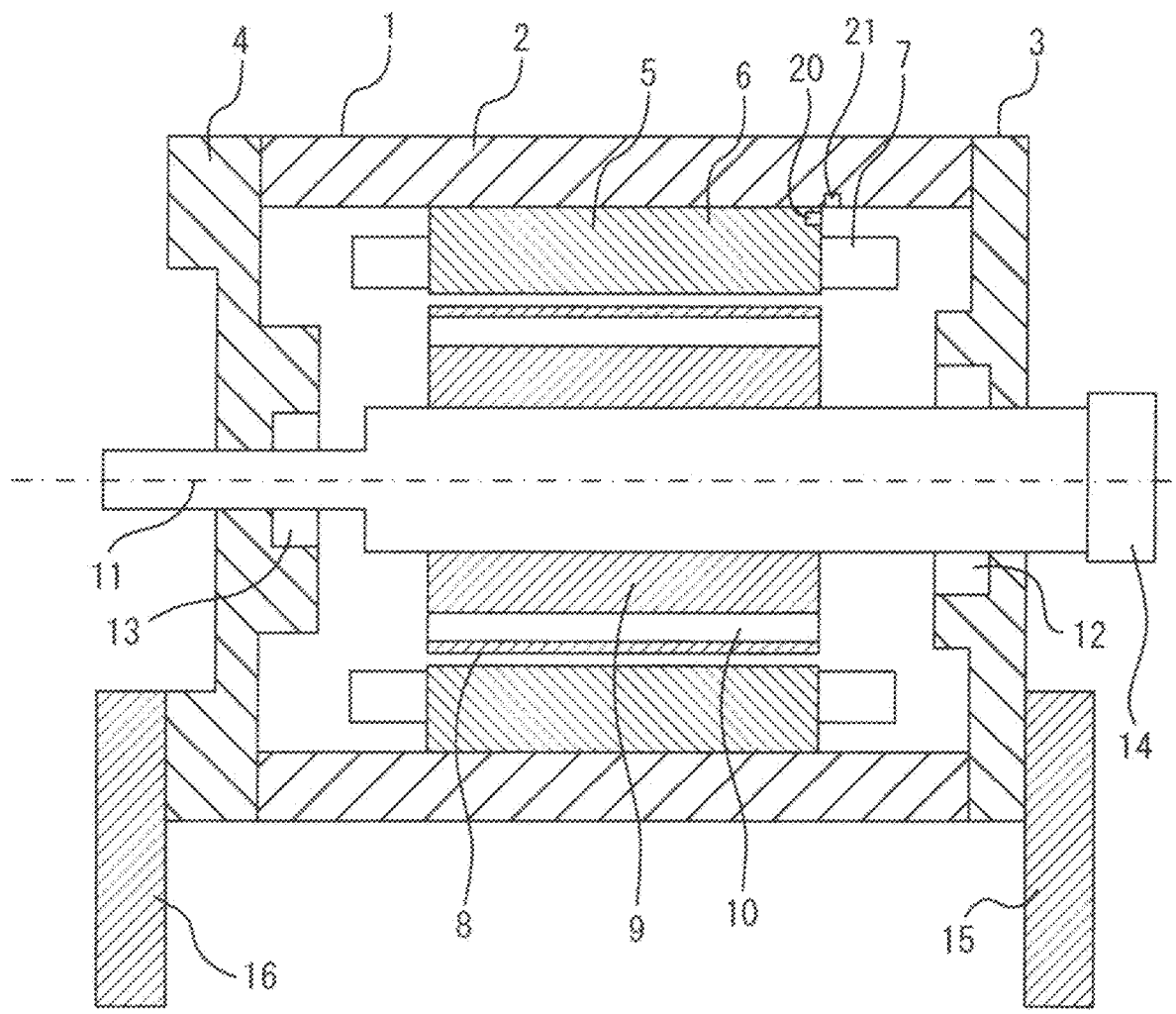
FIG. 11 is a sectional view showing a motor according to embodiment 9 of the present disclosure.

FIG. 11 is a sectional view showing a motor according to embodiment 9 of the present disclosure.

The thermocouples 20, 21 are respectively attached at locations close to the contact surface between the stator core 6 and the frame 2 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 at the stator core 6 and the frame 2, and a thermal resistance R8 between the stator core 6 and the frame 2. In addition, the heat transfer direction is determined from the magnitude relationship between the temperatures measured by the two thermocouples 20, 21.

In the temperature calculation unit 22 of the control device 19, if error between the heat transfer amount between the stator core 6 and the frame 2 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 10

Figure 12:
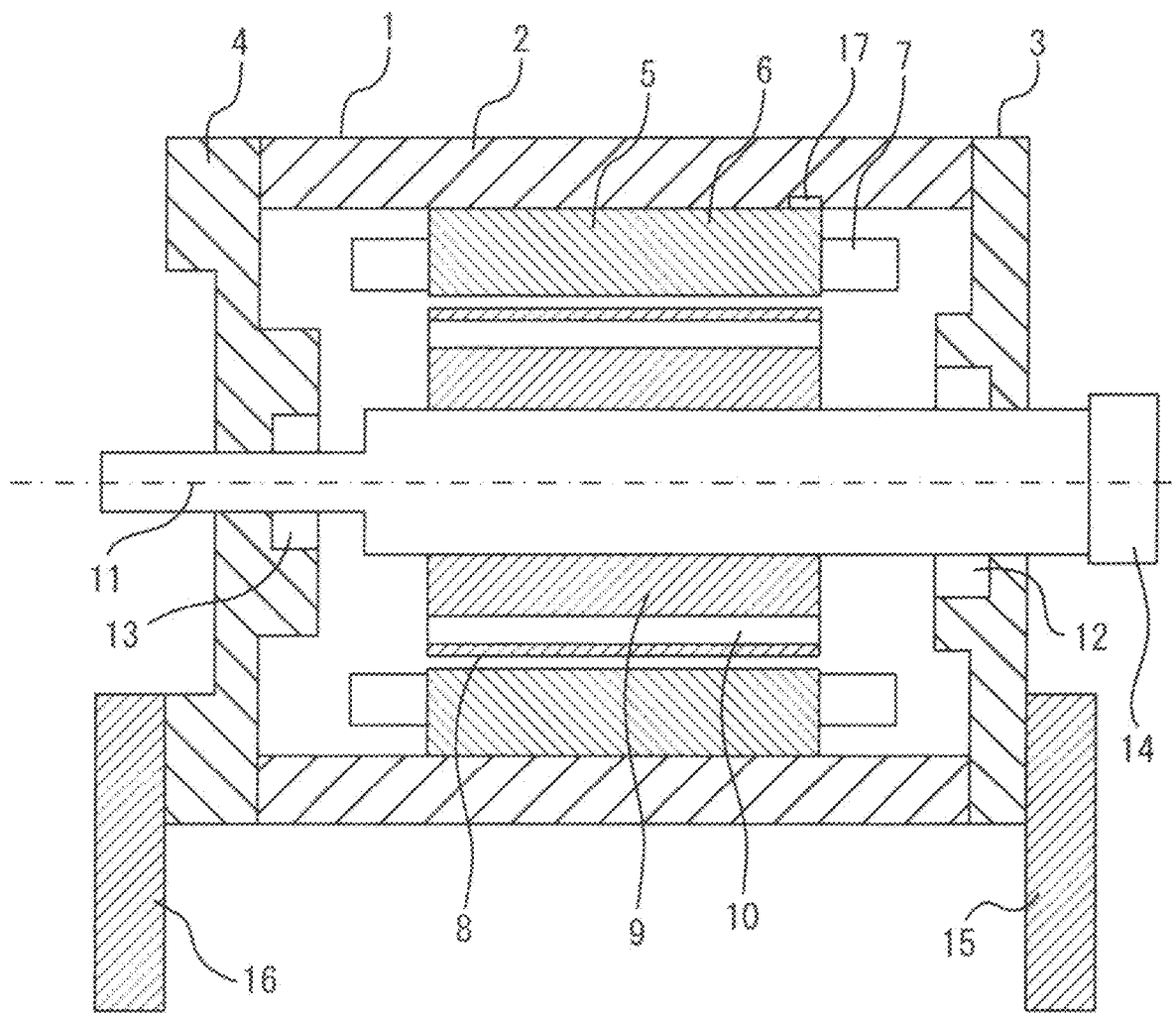
FIG. 12 is a sectional view showing a motor according to embodiment 10 of the present disclosure.

FIG. 12 is a sectional view showing a motor according to embodiment 10 of the present disclosure.

The heat flux sensor 17 is attached between the stator core 6 and the frame 2 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the heat transfer amount between the stator core 6 and the frame 2 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 11

Figure 13:
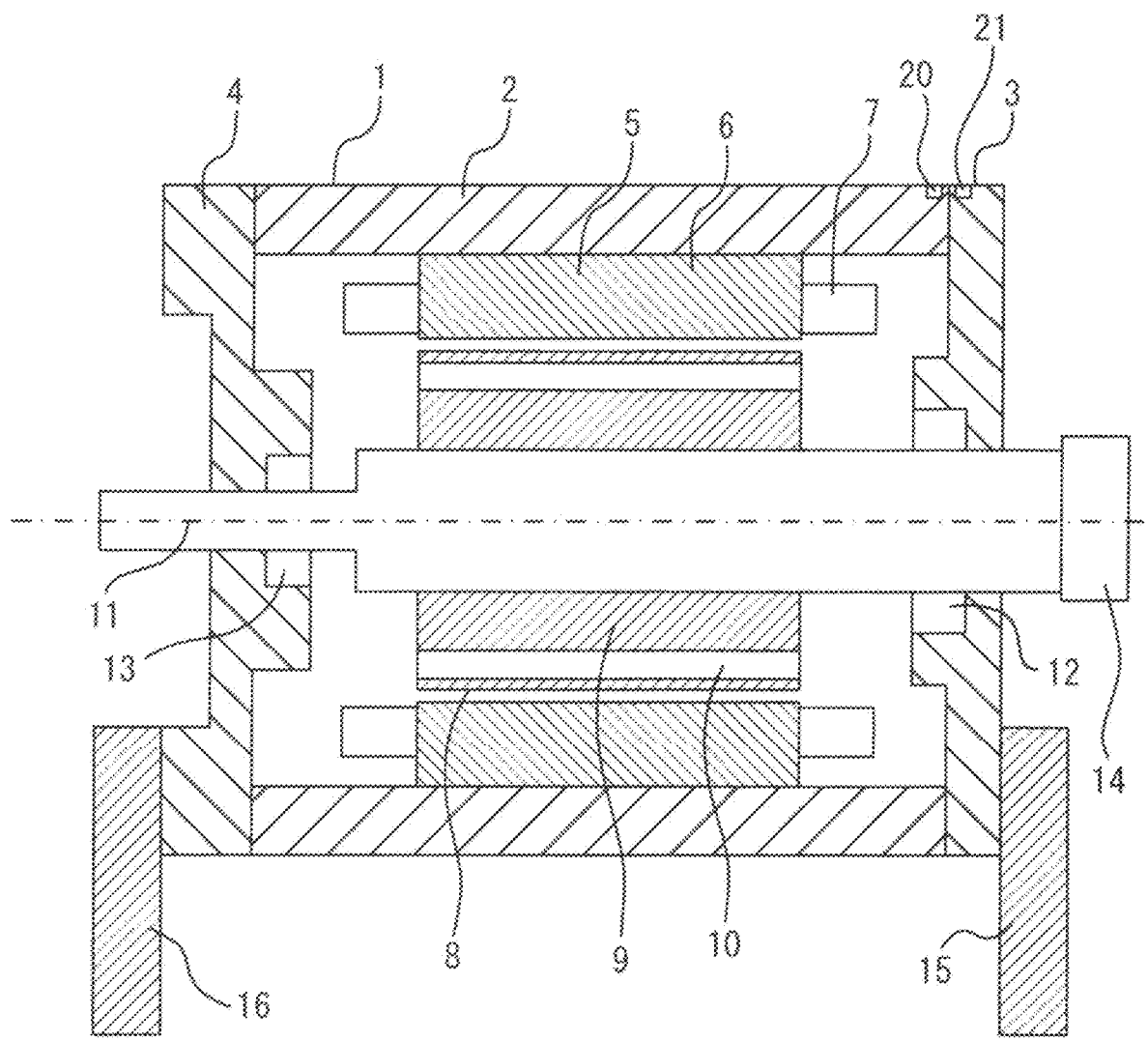
FIG. 13 is a sectional view showing a motor according to embodiment 11 of the present disclosure.

FIG. 13 is a sectional view showing a motor according to embodiment 11 of the present disclosure. The thermocouples 20, 21 are respectively attached at locations close to the contact surface between the frame 2 and the load-side bracket 3 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 at the frame 2 and the load-side bracket 3, and a thermal resistance R9 between the frame 2 and the load-side bracket 3. In addition, the heat transfer direction is determined from the magnitude relationship between the temperatures measured by the respective thermocouples 20, 21.

In the temperature calculation unit 22 of the control device 19, if error between the heat transfer amount between the frame 2 and the load-side bracket 3 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 11, the thermocouples 20, 21 are respectively provided at locations close to the contact surface between the frame 2 and the load-side bracket 3. However, the thermocouples 20, 21 may be respectively provided at locations close to the contact surface between the frame 2 and the non-load-side bracket 4.

Embodiment 12

Figure 14:
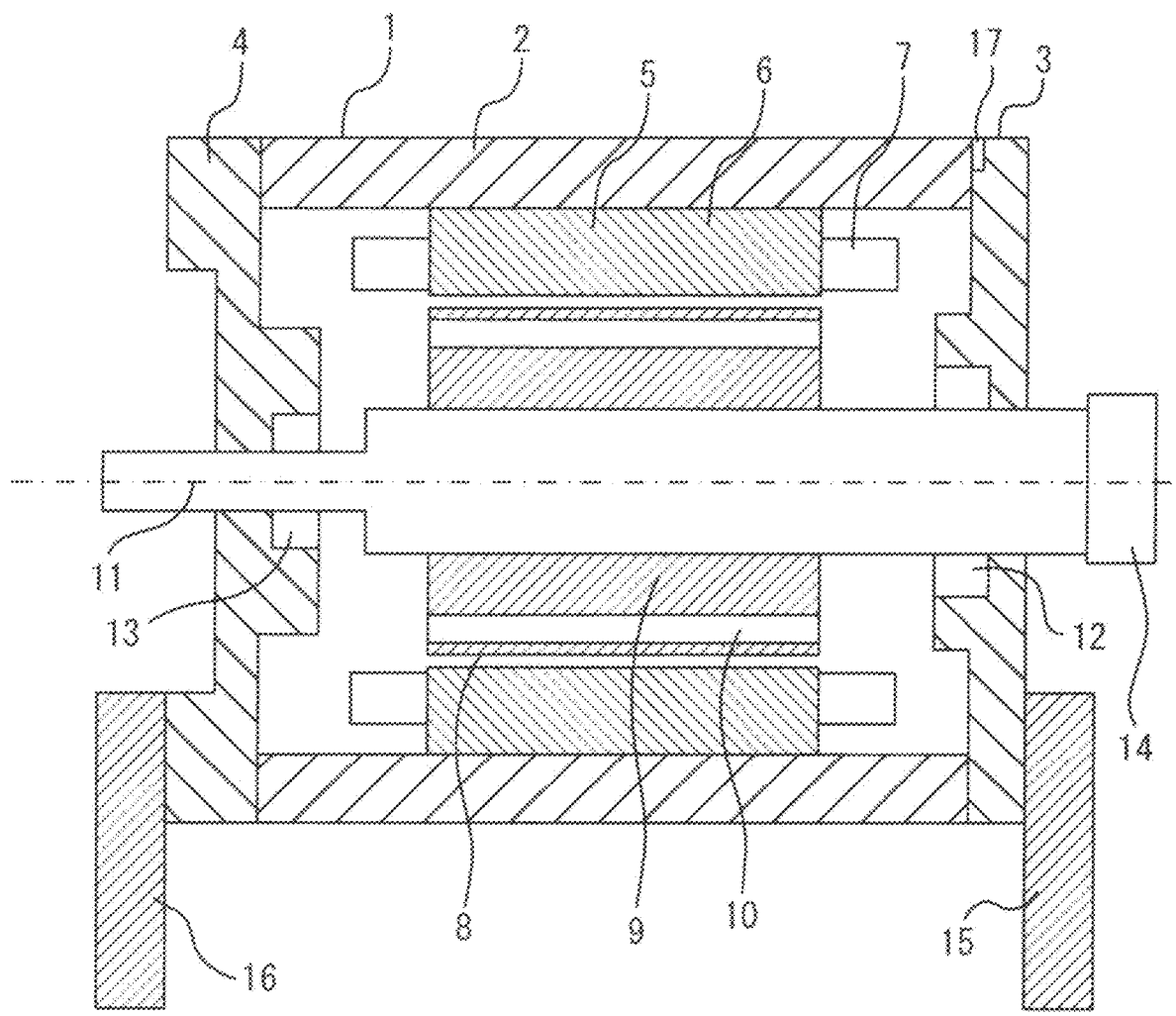
FIG. 14 is a sectional view showing a motor according to embodiment 12 of the present disclosure.

FIG. 14 is a sectional view showing a motor according to embodiment 12 of the present disclosure.

The heat flux sensor 17 is attached between the frame 2 and the load-side bracket 3 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the heat transfer amount between the frame 2 and the load-side bracket 3 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 12, the heat flux sensor 17 is provided between the frame 2 and the load-side bracket 3. However, the heat flux sensor 17 may be provided between the frame 2 and the non-load-side bracket 4.

Embodiment 13

Figure 15:
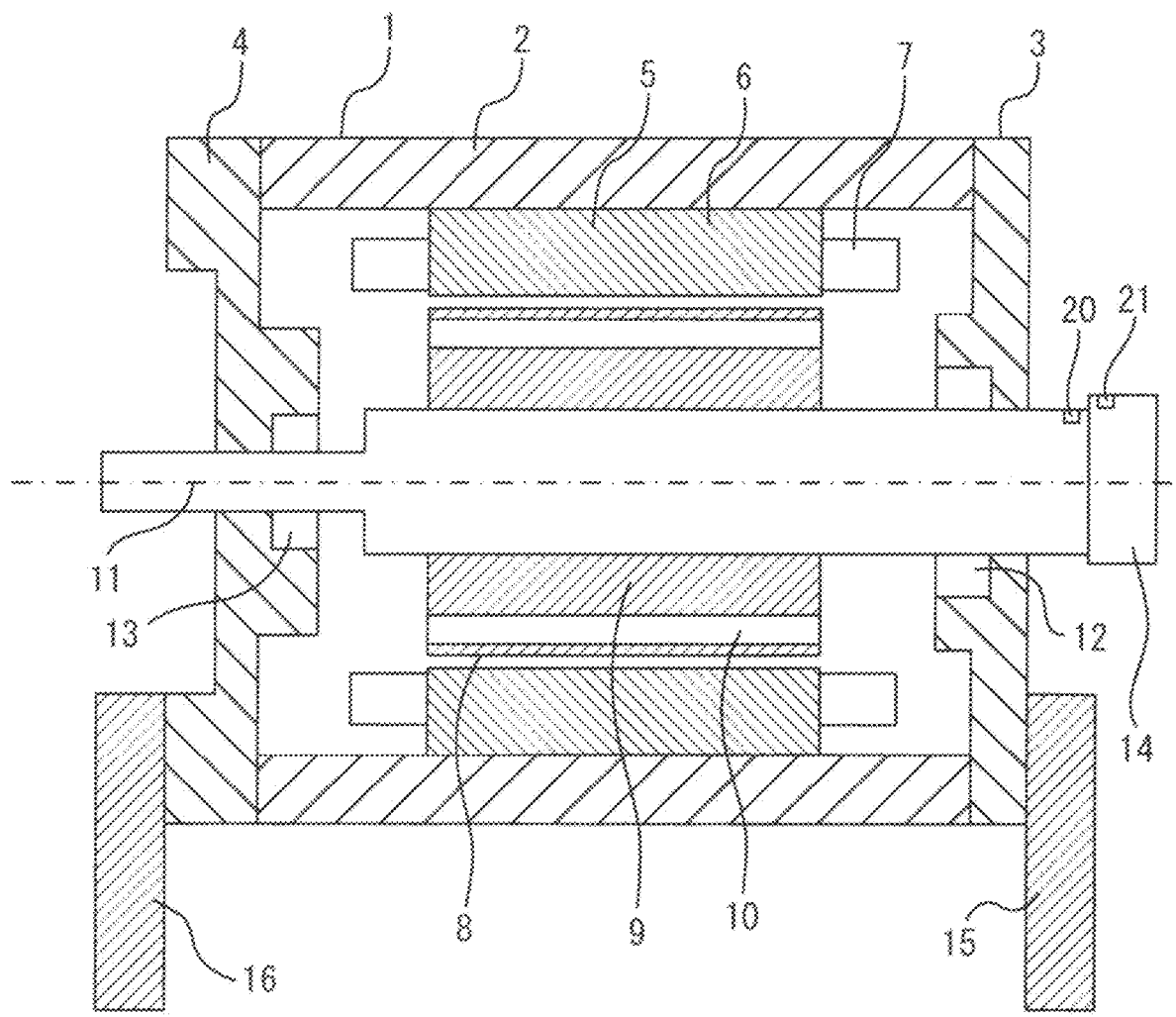
FIG. 15 is a sectional view showing a motor according to embodiment 13 of the present disclosure.

FIG. 15 is a sectional view showing a motor according to embodiment 13 of the present disclosure.

The thermocouples 20, 21 are respectively attached at locations close to the contact surface between the shaft 11 and the coupling 14 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 at the shaft 11 and the coupling 14, and a thermal resistance R11 between the shaft 11 and the coupling 14. In addition, the heat transfer direction is determined from the magnitude relationship between the temperatures measured by the respective thermocouples 20, 21.

In the temperature calculation unit 22 of the control device 19, if error between the heat transfer amount between the shaft 11 and the coupling 14 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 14

Figure 16:
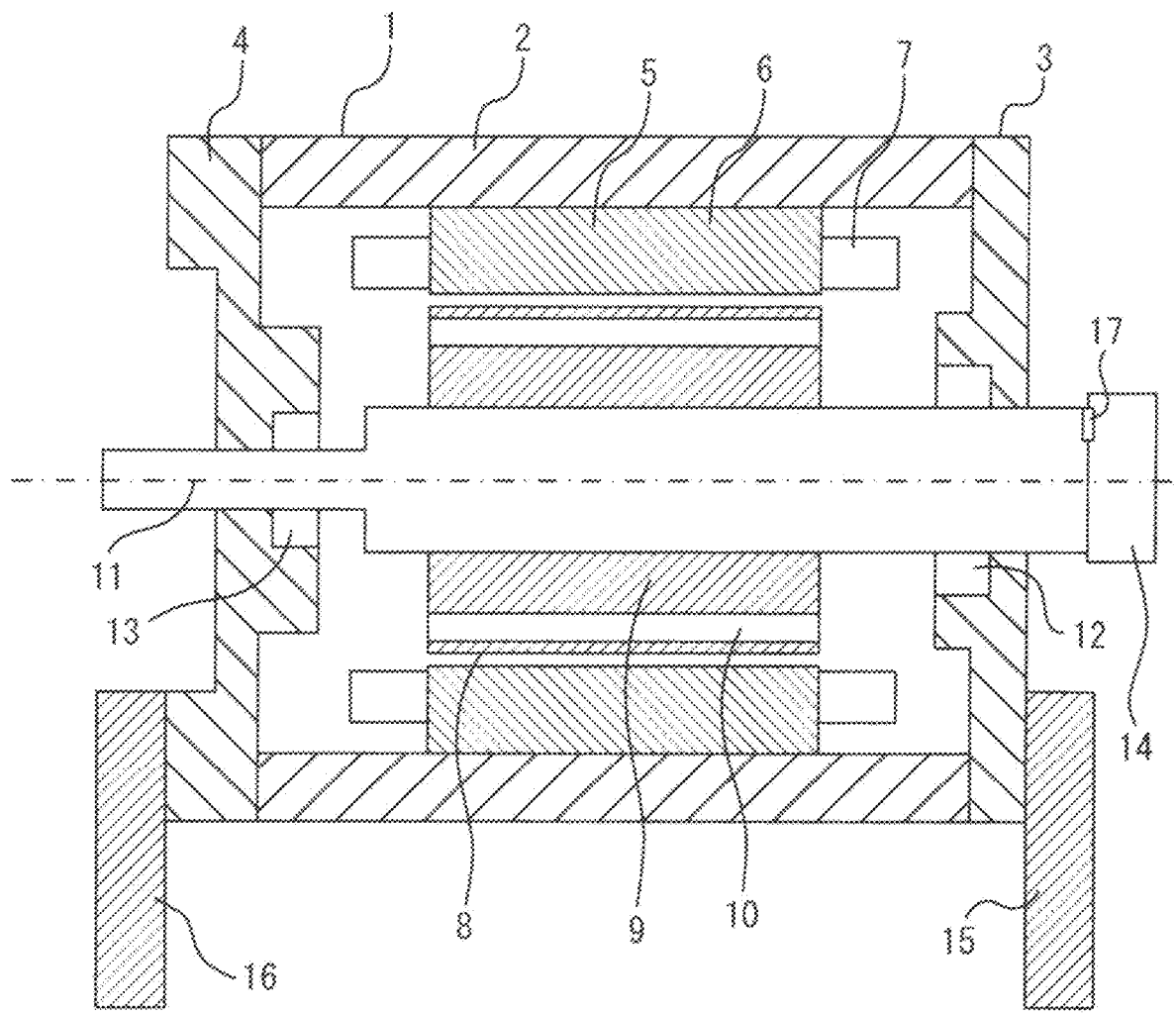
FIG. 16 is a sectional view showing a motor according to embodiment 14 of the present disclosure.

FIG. 16 is a sectional view showing a motor according to embodiment 14 of the present disclosure.

The heat flux sensor 17 is attached between the shaft 11 and the coupling 14 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the heat transfer amount between the shaft 11 and the coupling 14 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 15

Figure 17:
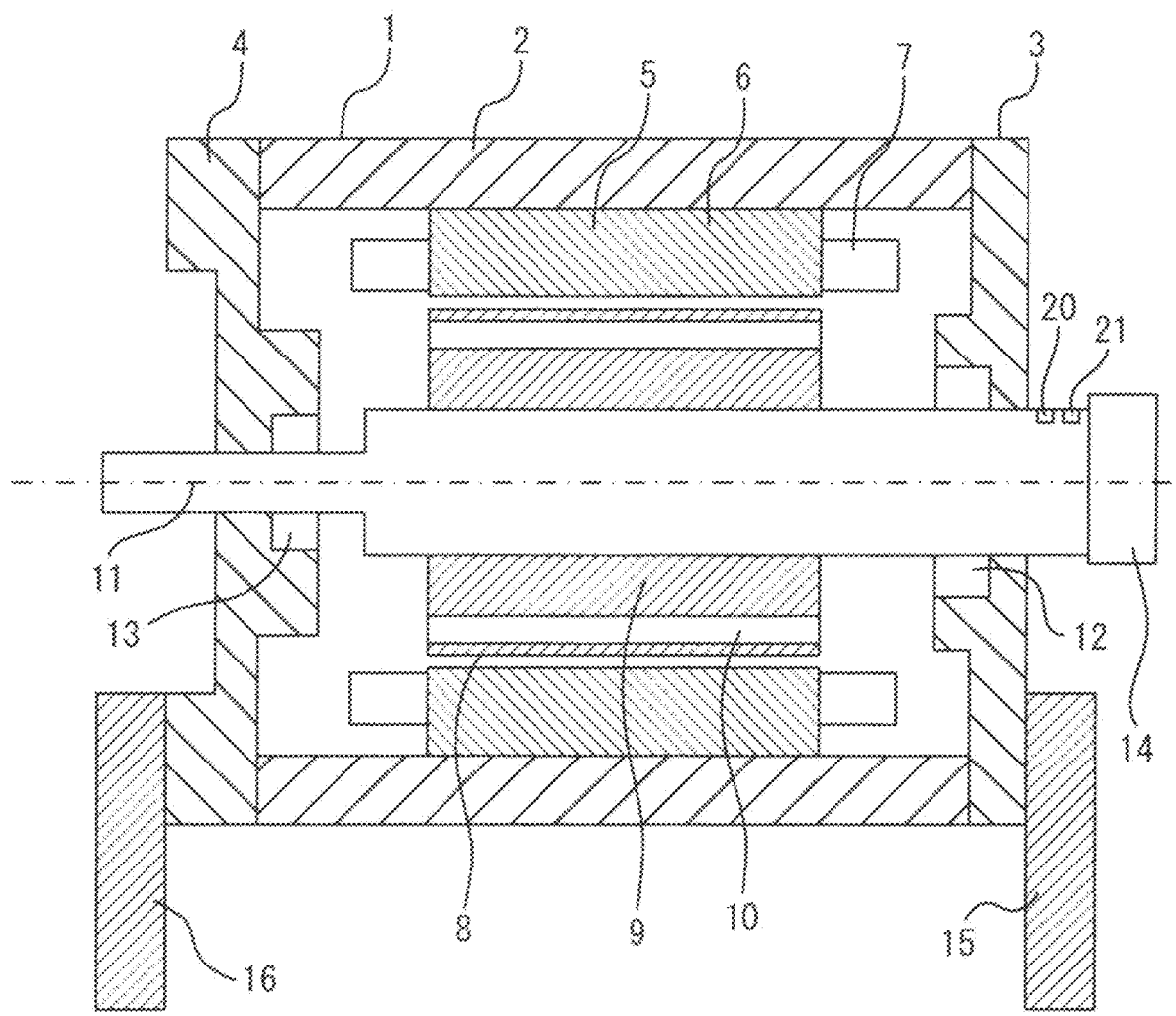
FIG. 17 is a sectional view showing a motor according to embodiment 15 of the present disclosure.

FIG. 17 is a sectional view showing a motor according to embodiment 15 of the present disclosure.

The thermocouples 20, 21 are respectively attached at two locations of the shaft 11 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 provided at the shaft 11, and a thermal resistance R15 calculated from the shape and the thermal conductivity of the shaft 11. In addition, the heat transfer direction is determined from the magnitude relationship between the temperatures measured by the thermocouple 20 and the thermocouple 21.

In the temperature calculation unit 22 of the control device 19, if error between the transfer amount of heat passing through the inside of the shaft 11 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 16

Figure 18:
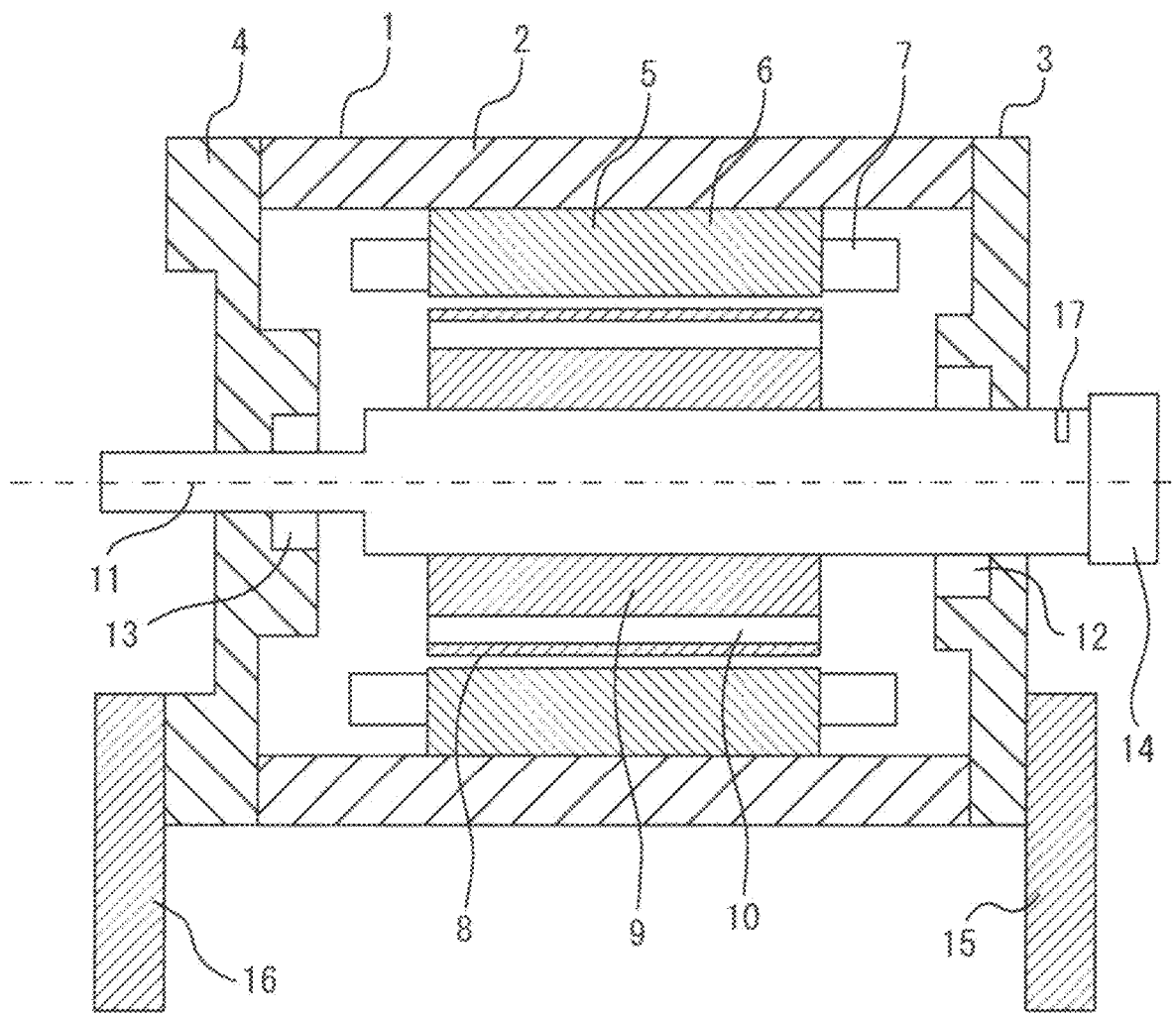
FIG. 18 is a sectional view showing a motor according to embodiment 16 of the present disclosure.

FIG. 18 is a sectional view showing a motor according to embodiment 16 of the present disclosure.

The heat flux sensor 17 is attached to the shaft 11 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the transfer amount of heat passing through the inside of the shaft 11 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 17

Figure 19:
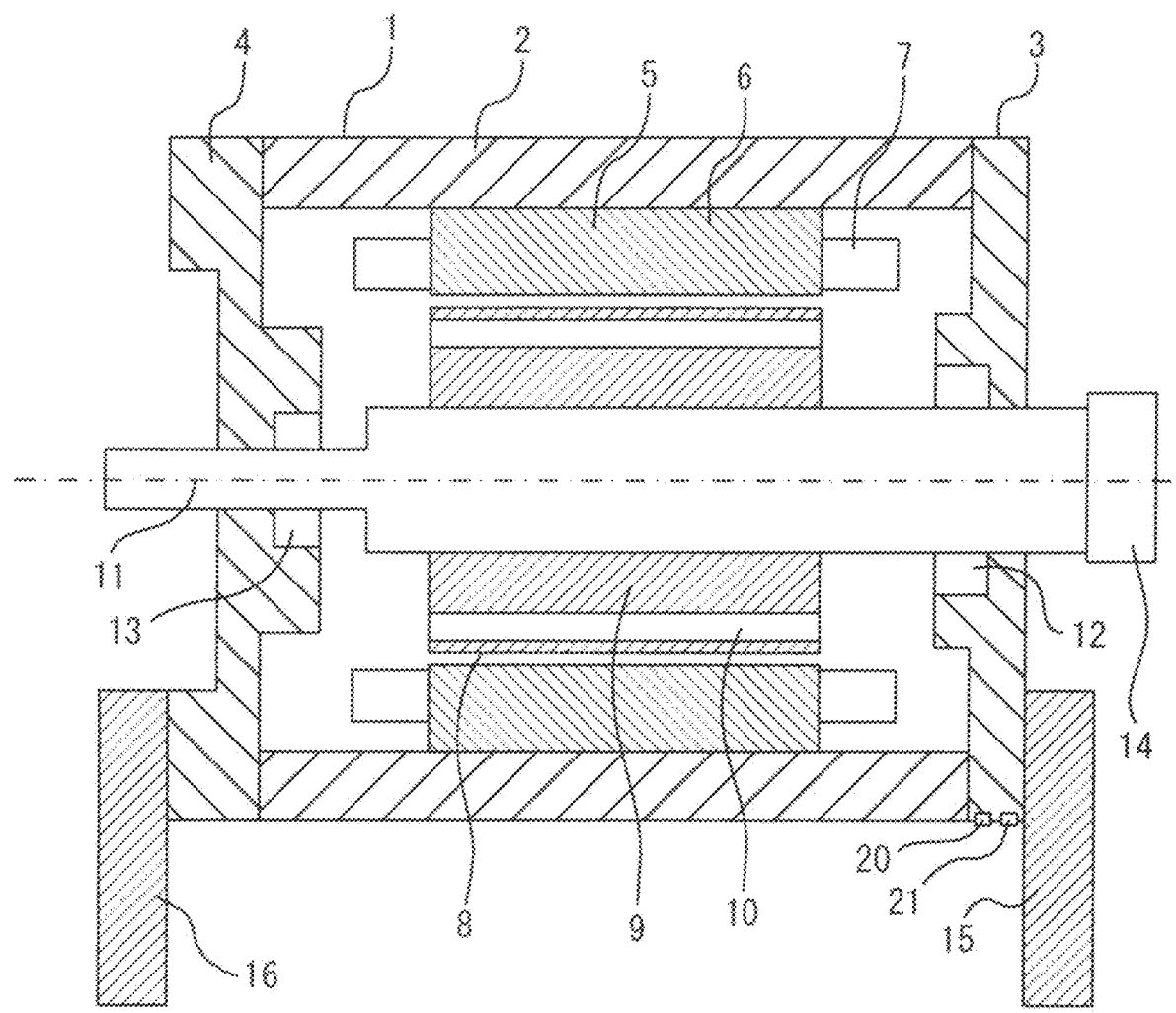
FIG. 19 is a sectional view showing a motor according to embodiment 17 of the present disclosure.

FIG. 19 is a sectional view showing a motor according to embodiment 17 of the present disclosure.

The thermocouples 20, 21 are respectively attached at two locations of the load-side bracket 3 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the two thermocouples 20, 21 provided at the load-side bracket 3, and a thermal resistance R17 calculated from the shape and the thermal conductivity of the load-side bracket 3. In addition, the heat transfer direction is determined from the magnitude relationship between the temperatures measured by the respective thermocouples 20, 21.

In the temperature calculation unit 22 of the control device 19, if error between the transfer amount of heat passing through the inside of the load-side bracket 3 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 17, the thermocouples 20, 21 are provided at two locations of the load-side bracket 3. However, the thermocouples 20, 21 may be provided at two locations of the non-load-side bracket 4.

Embodiment 18

Figure 20:
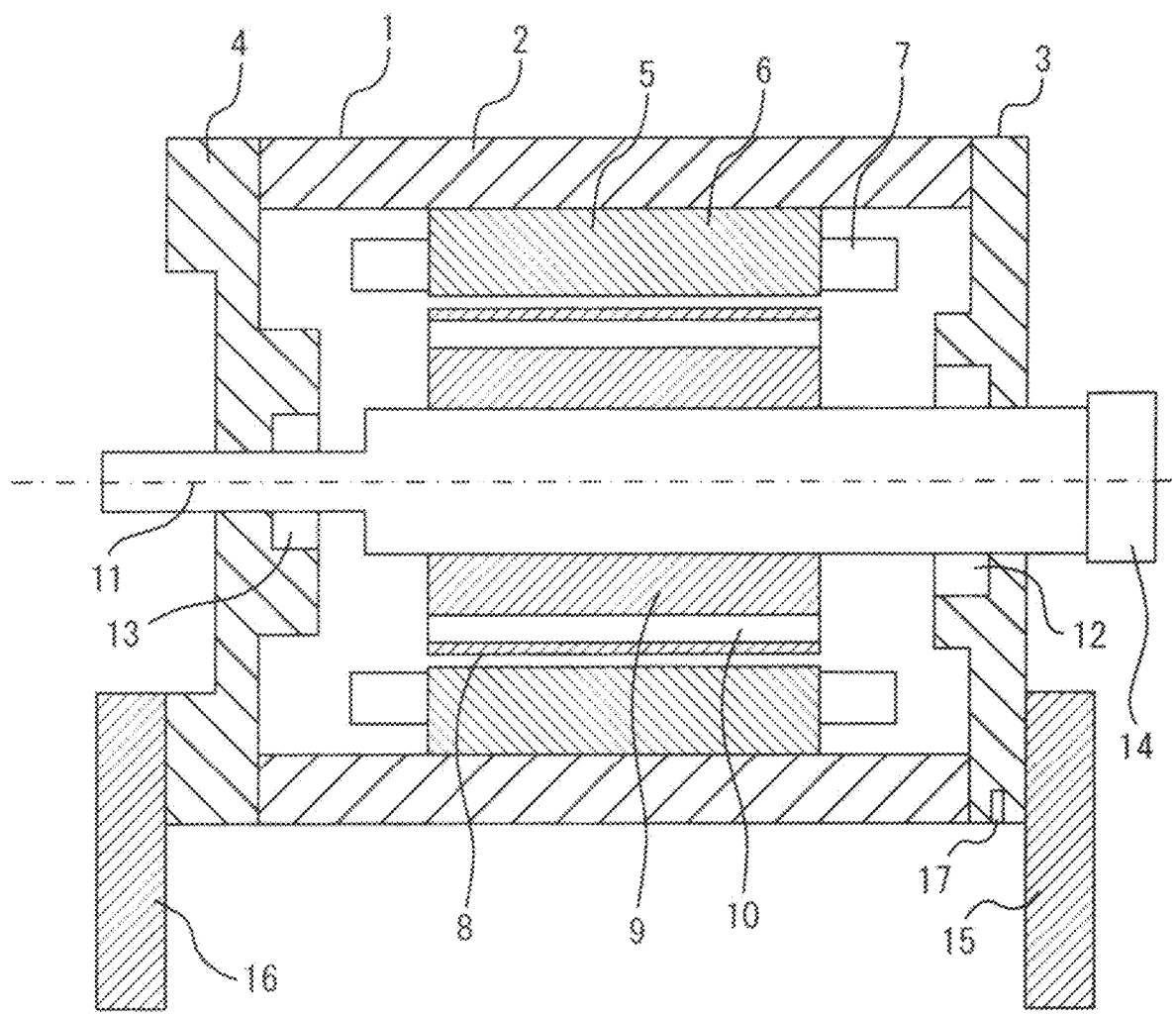
FIG. 20 is a sectional view showing a motor according to embodiment 18 of the present disclosure.

FIG. 20 is a sectional view showing a motor according to embodiment 18 of the present disclosure.

The heat flux sensor 17 is attached to the load-side bracket 3 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the transfer amount of heat passing through the inside of the load-side bracket 3 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 18, the heat flux sensor 17 is provided at the load-side bracket 3. However, the heat flux sensor 17 may be provided at the non-load-side bracket 4.

Embodiment 19

Figure 21:
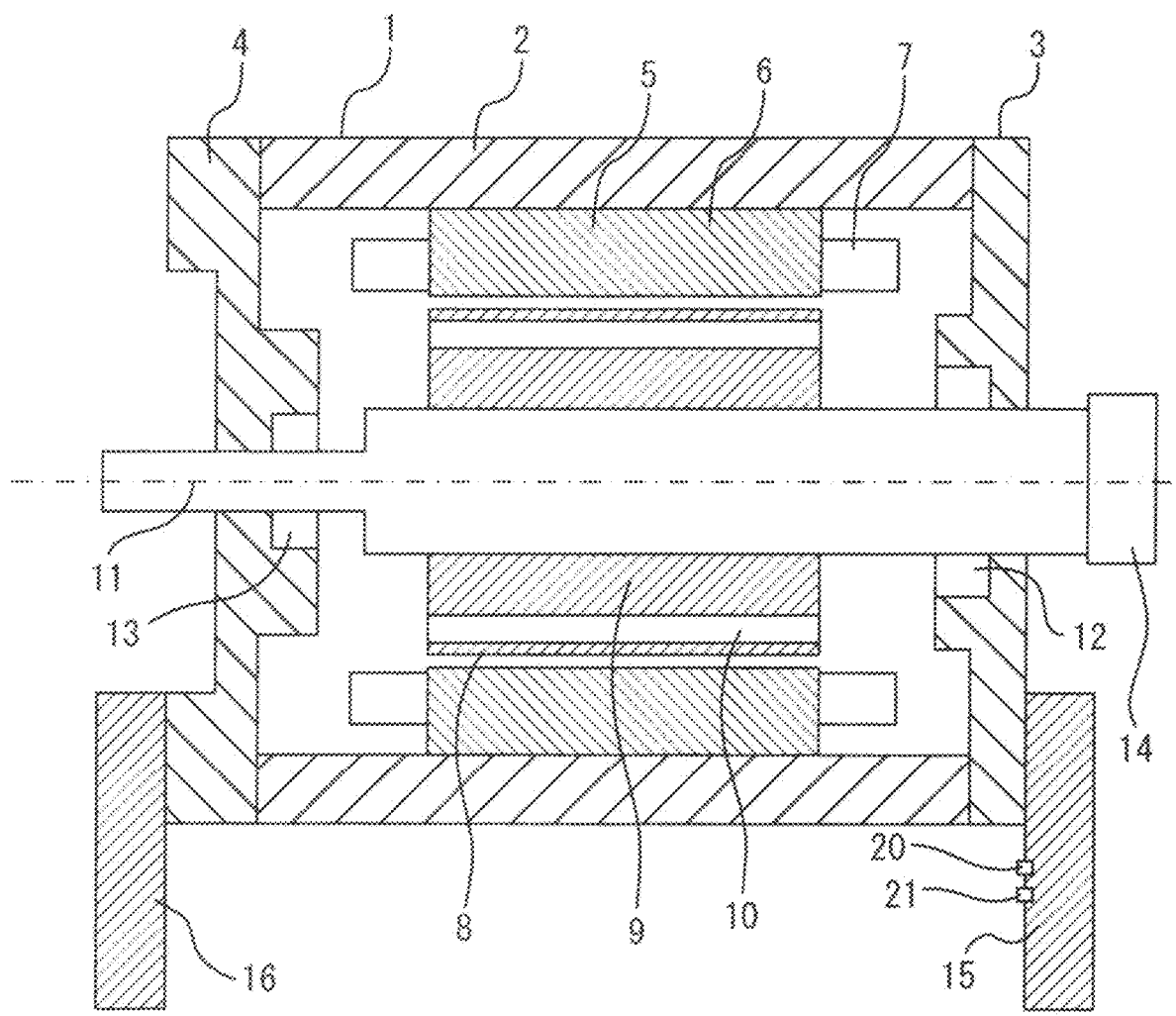
FIG. 21 is a sectional view showing a motor according to embodiment 19 of the present disclosure.

FIG. 21 is a sectional view showing a motor according to embodiment 19 of the present disclosure.

The thermocouples 20, 21 are respectively attached at two locations of the load-side flange 15 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the two thermocouples 20, 21 provided at the load-side flange 15, and a thermal resistance R19 calculated from the shape and the thermal conductivity of the load-side flange 15. In addition, the heat transfer direction is determined from the magnitude relationship between the temperatures measured by the respective thermocouples 20, 21.

In the temperature calculation unit 22 of the control device 19, if error between the transfer amount of heat passing through the inside of the load-side flange 15 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 19, the thermocouples 20, 21 are respectively provided at two locations of the load-side flange 15. However, the thermocouples 20, 21 may be respectively provided at two locations of the non-load-side flange 16.

Embodiment 20

Figure 22:
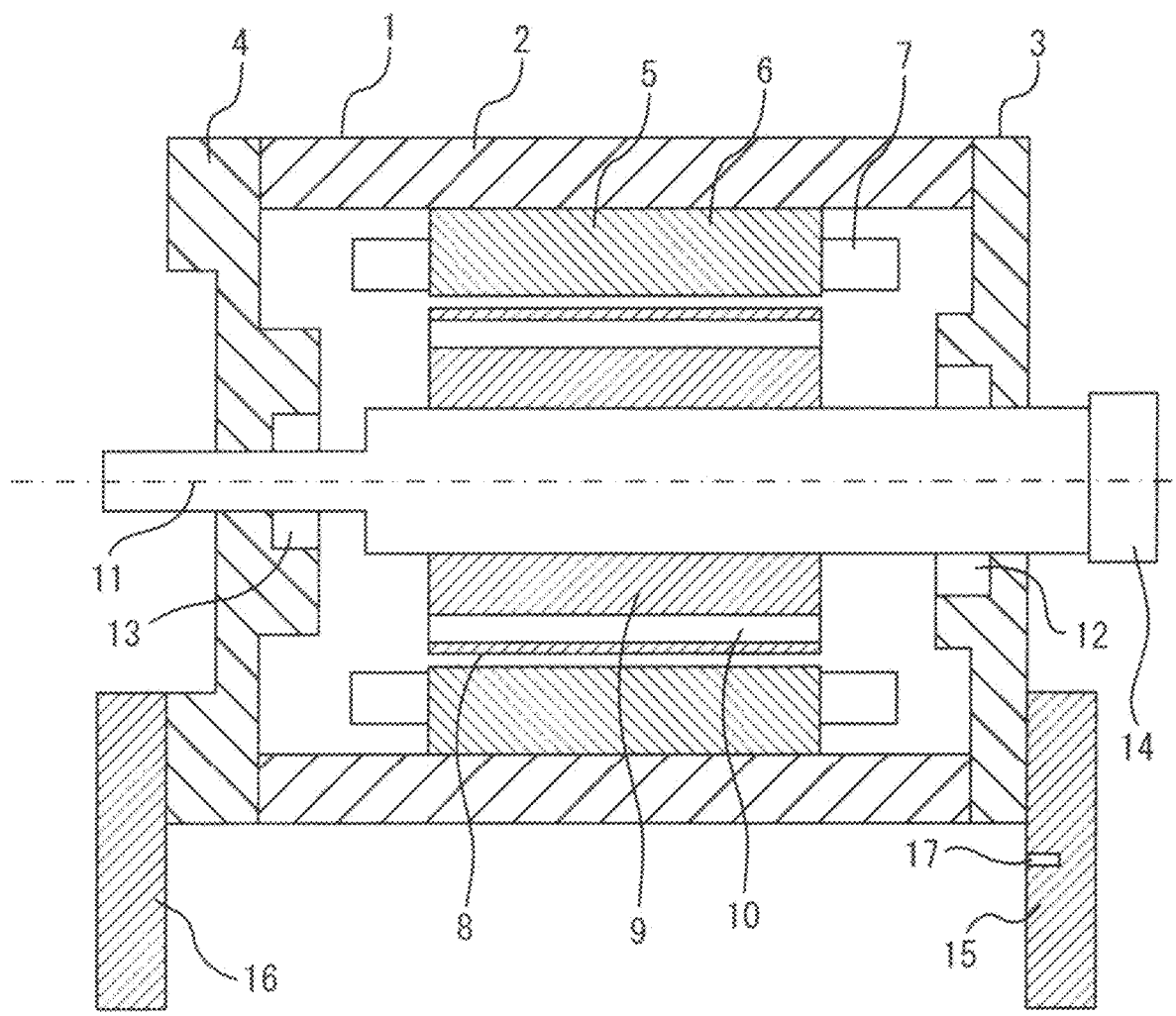
FIG. 22 is a sectional view showing a motor according to embodiment 20 of the present disclosure.

FIG. 22 is a sectional view showing a motor according to embodiment 20 of the present disclosure.

The heat flux sensor 17 is attached to the load-side flange 15 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the transfer amount of heat passing through the inside of the load-side flange 15 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 20, the heat flux sensor 17 is provided at the load-side flange 15. However, the heat flux sensor 17 may be provided at the non-load-side flange 16.

Embodiment 21

Figure 23:
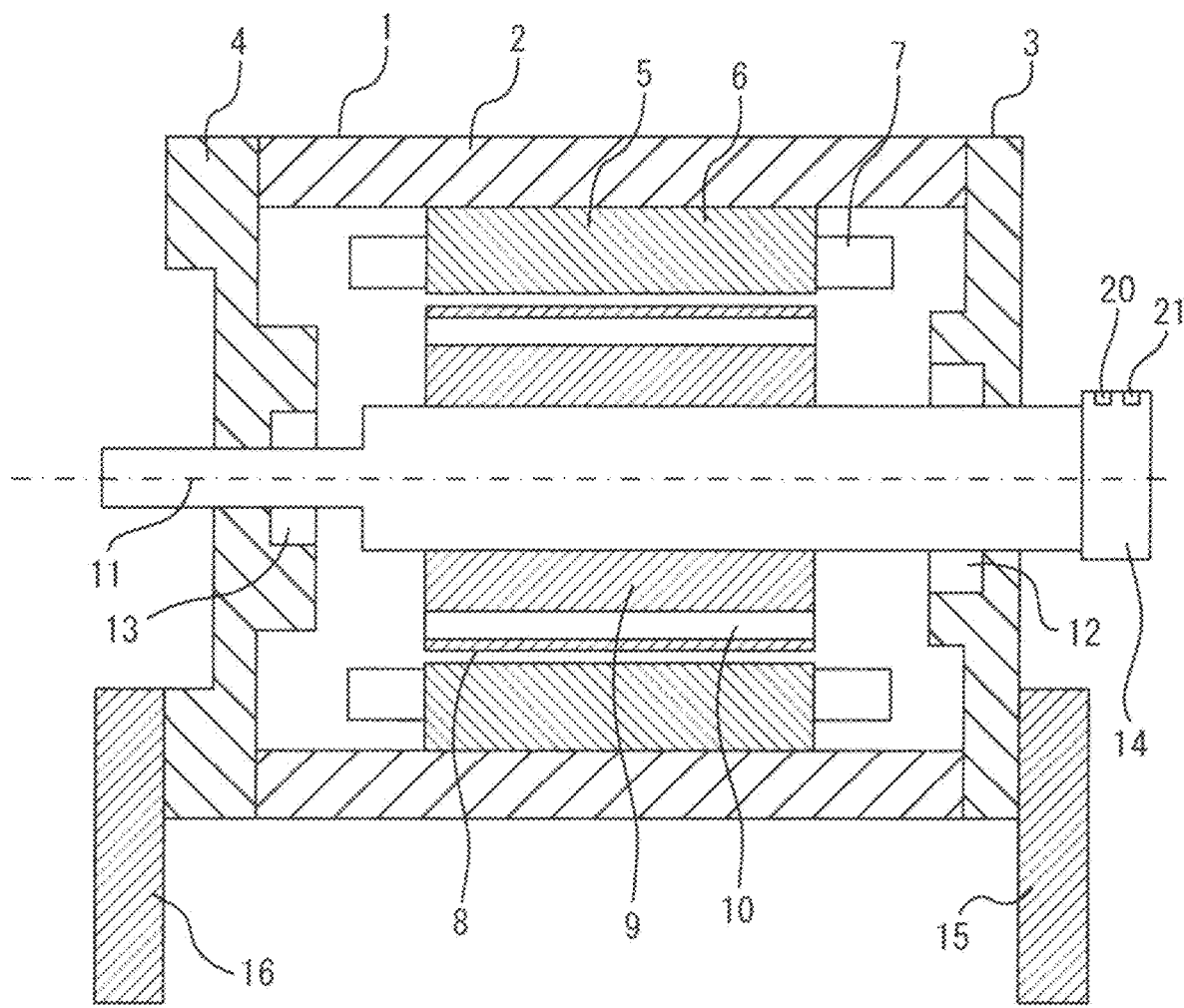
FIG. 23 is a sectional view showing a motor according to embodiment 21 of the present disclosure.

FIG. 23 is a sectional view showing a motor according to embodiment 21 of the present disclosure.

The thermocouples 20, 21 are respectively attached at two locations of the coupling 14 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 at the coupling 14, and a thermal resistance R21 calculated from the shape and the thermal conductivity of the coupling 14. In addition, the heat transfer direction is determined from the magnitude relationship between the temperatures measured by the respective thermocouples 20, 21.

In the temperature calculation unit 22 of the control device 19, if error between the transfer amount of heat passing through the inside of the coupling 14 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 22

Figure 24:
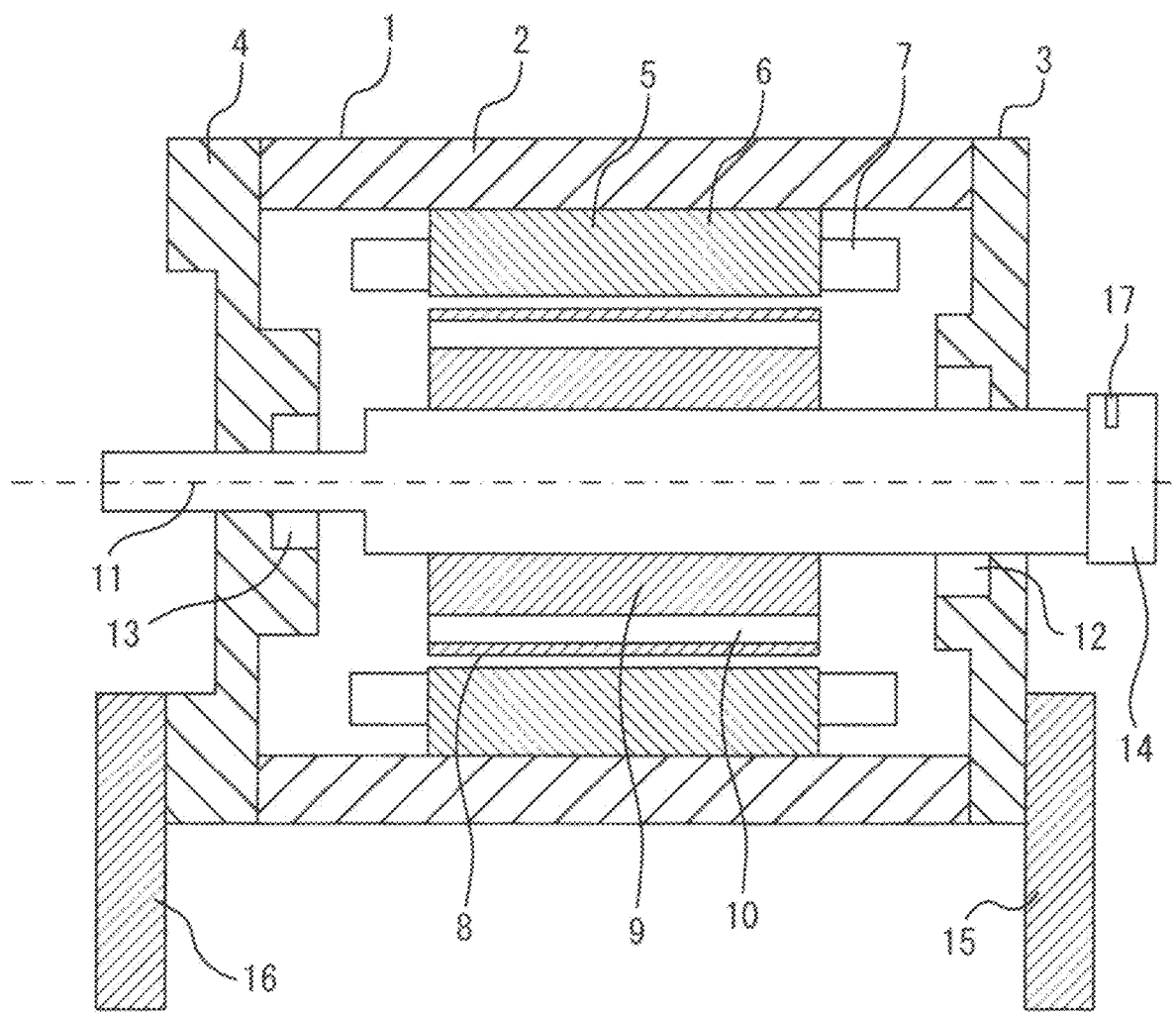
FIG. 24 is a sectional view showing a motor according to embodiment 22 of the present disclosure.

FIG. 24 is a sectional view showing a motor according to embodiment 22 of the present disclosure.

The heat flux sensor 17 is attached to the coupling 14 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the transfer amount of heat passing through the inside of the coupling 14 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 23

Figure 25:
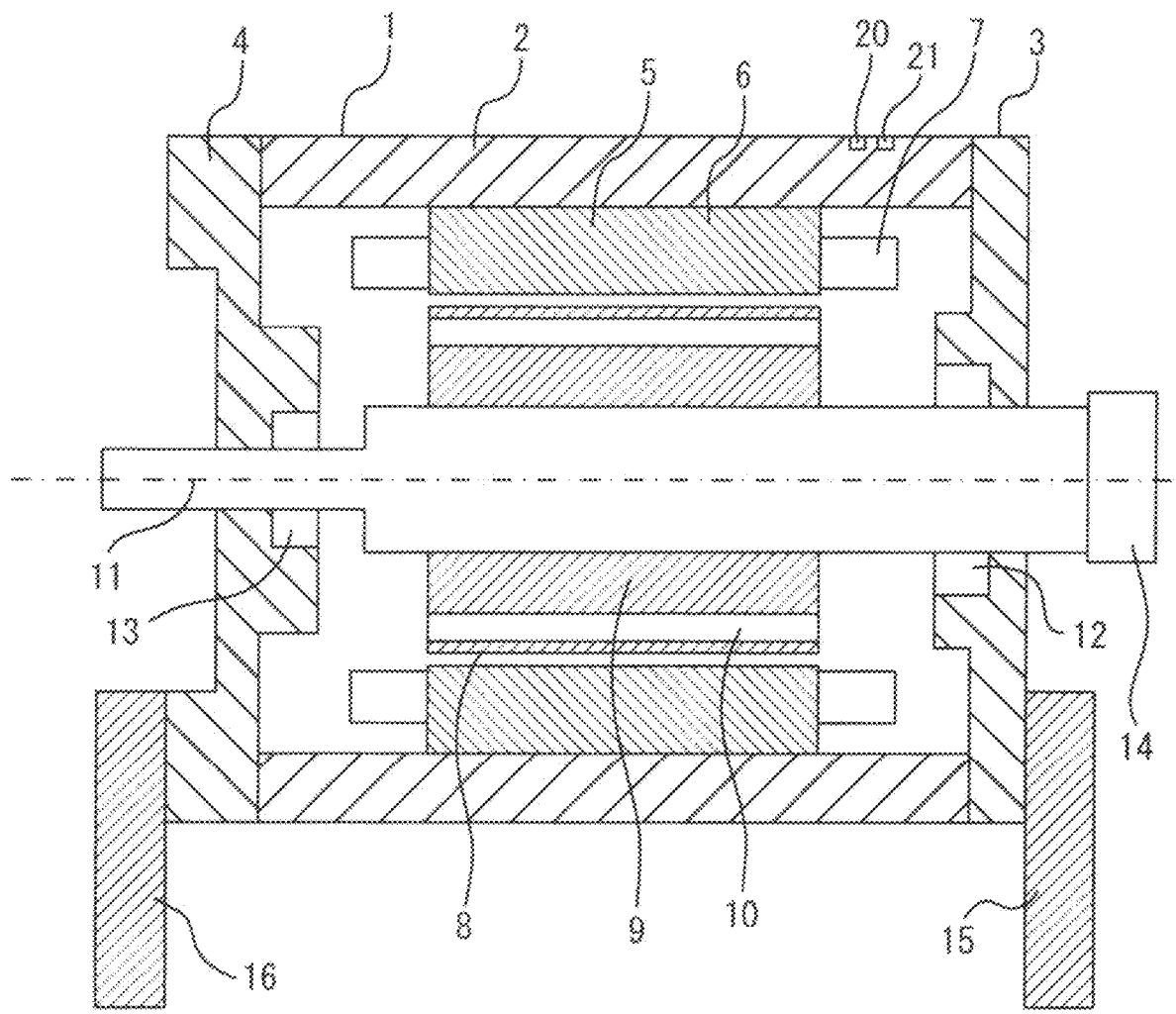
FIG. 25 is a sectional view showing a motor according to embodiment 23 of the present disclosure.

FIG. 25 is a sectional view showing a motor according to embodiment 23 of the present disclosure.

The thermocouples 20, 21 are respectively attached at two locations of the frame 2 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 at the frame 2, and a thermal resistance R23 calculated from the shape and the thermal conductivity of the frame 2. In addition, the heat transfer direction is determined from the magnitude relationship between the temperatures measured by the respective thermocouples 20, 21.

In the temperature calculation unit 22 of the control device 19, if error between the transfer amount of heat passing through the inside of the frame 2 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 24

Figure 26:
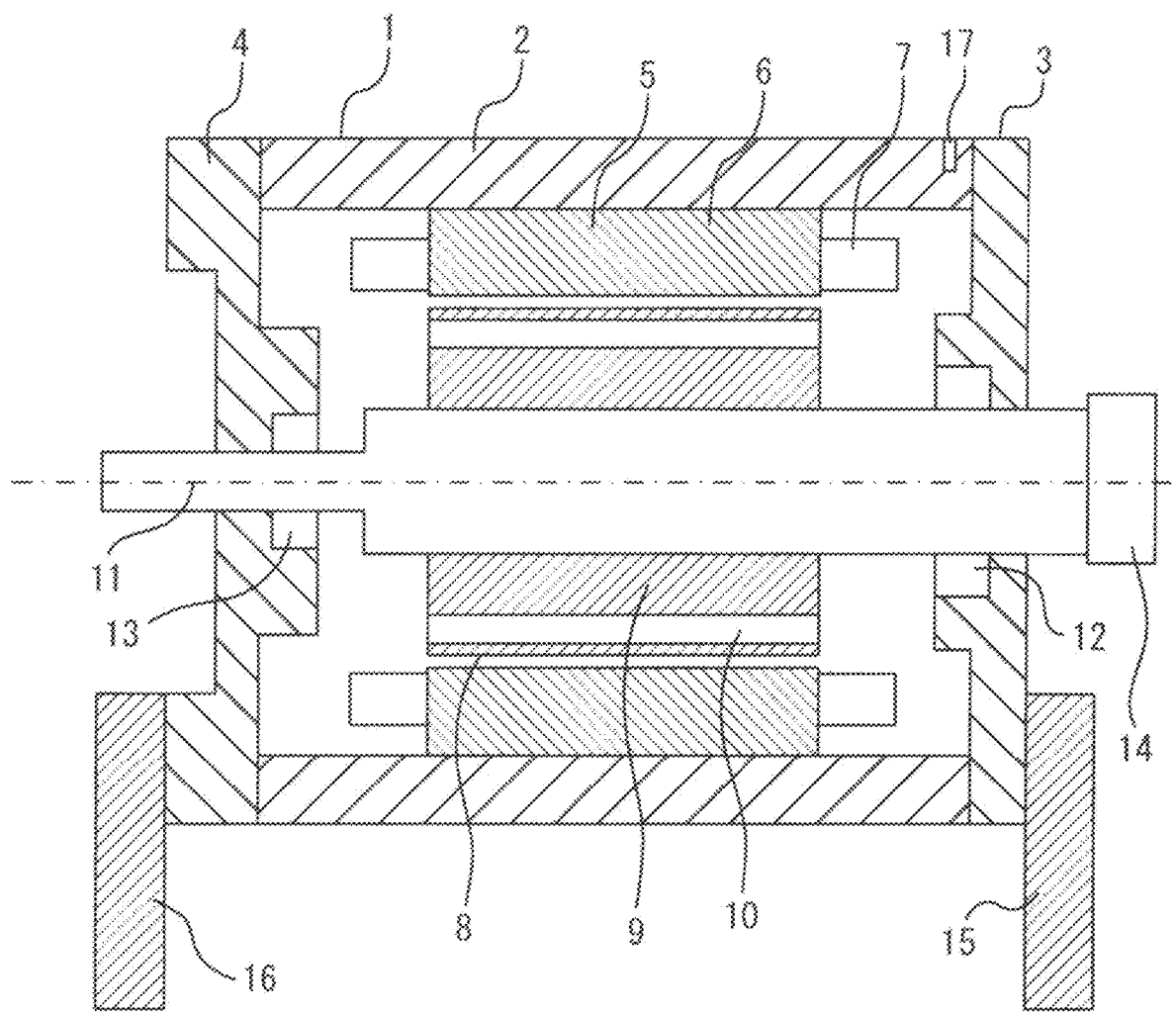
FIG. 26 is a sectional view showing a motor according to embodiment 24 of the present disclosure.

FIG. 26 is a sectional view showing a motor according to embodiment 24 of the present disclosure.

The heat flux sensor 17 is attached to the frame 2 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the transfer amount of heat passing through the inside of the frame 2 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Embodiment 25

Figure 27:
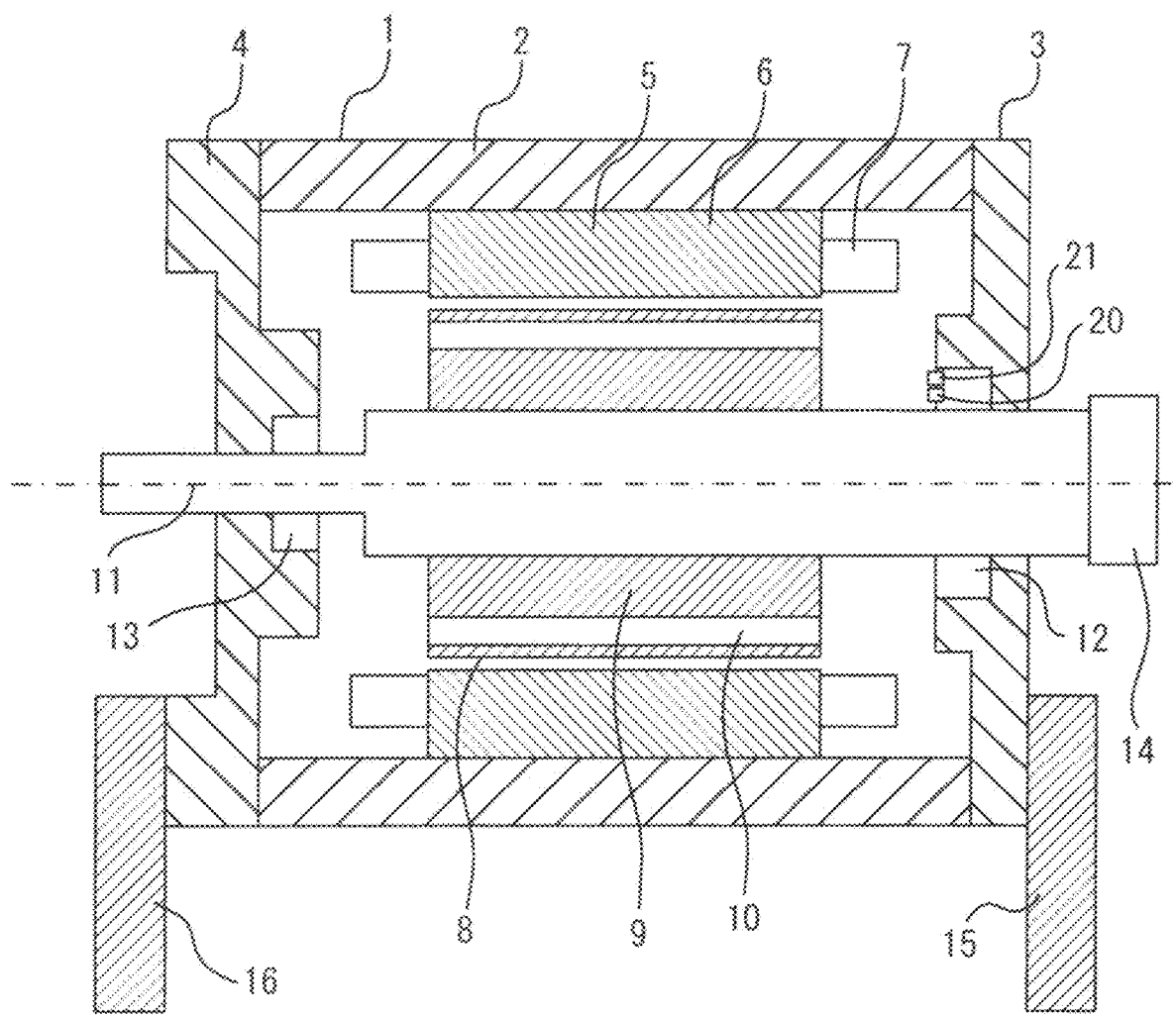
FIG. 27 is a sectional view showing a motor according to embodiment 25 of the present disclosure.

FIG. 27 is a sectional view showing a motor according to embodiment 25 of the present disclosure.

The thermocouples 20, 21 are respectively attached at two locations of the load-side bearing 12 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a difference between the temperatures measured by the respective thermocouples 20, 21 at the load-side bearing 12, and a thermal resistance R25 calculated from the shape and the thermal conductivity of the load-side bearing 12. In addition, the heat transfer direction is determined from the magnitude relationship between the temperatures measured by the thermocouple 20 and the thermocouple 21.

In the temperature calculation unit 22 of the control device 19, if error between the transfer amount of heat passing through the inside of the load-side bearing 12 calculated in a course of calculation for the temperature T based on the thermal circuit network, and the heat transfer amount calculated from the temperature measurement values, exceeds a threshold set in advance, or if the transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components.

Owing to improvement in temperature estimation accuracy, it becomes possible to reduce temperature margins taken into consideration in setting of the temperature thresholds when a current command is sent from the control device 19 to the inverter 18, and thus the limit of operation of the motor 1 can be expanded.

In embodiment 25, the thermocouples 20, 21 are respectively provided at two locations of the load-side bearing 12. However, the thermocouples 20, 21 may be respectively provided at two locations of the non-load-side bearing 13.

Embodiment 26

Figure 28:
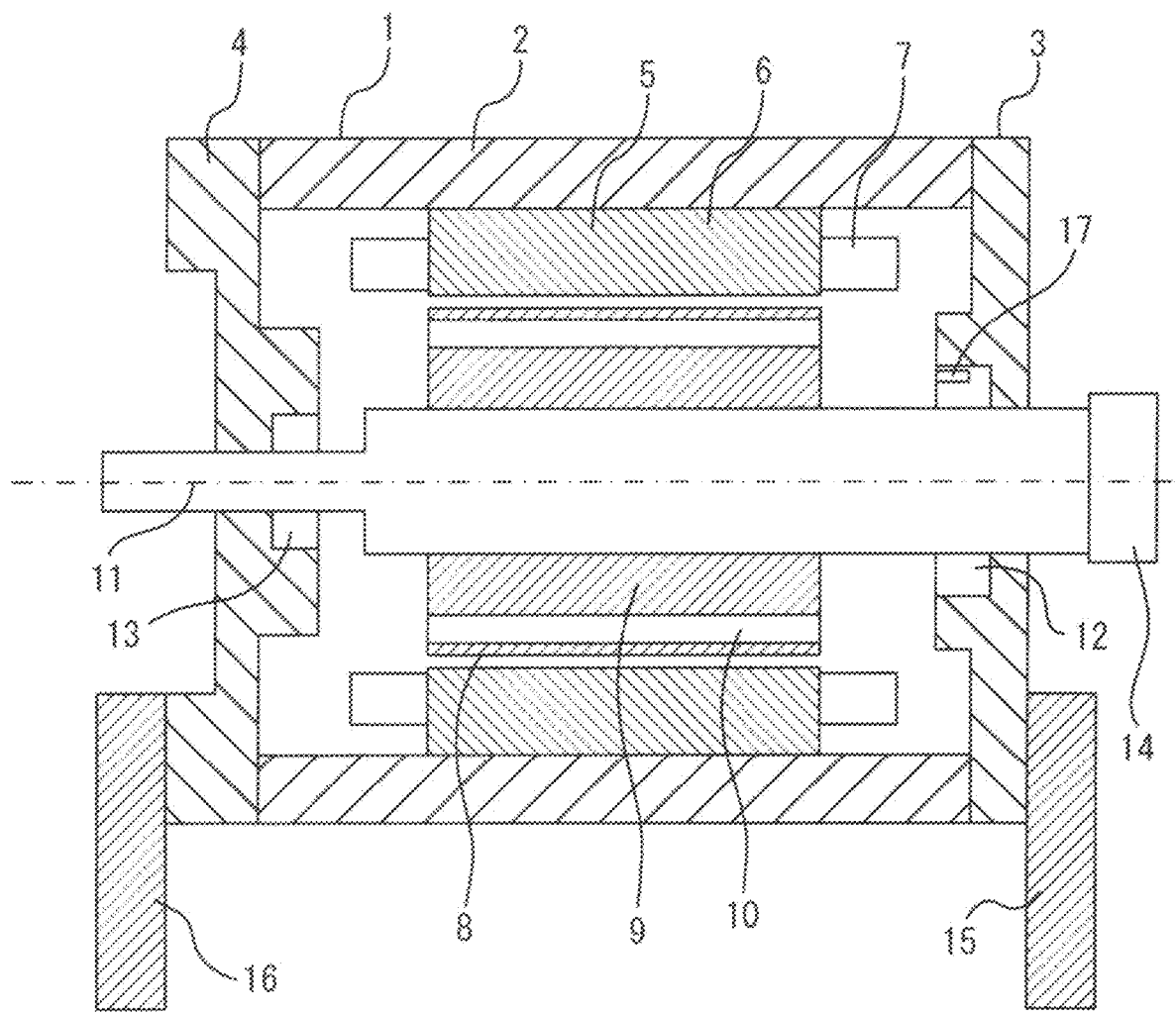
FIG. 28 is a sectional view showing a motor according to embodiment 26 of the present disclosure.

FIG. 28 is a sectional view showing a motor according to embodiment 26 of the present disclosure.

The heat flux sensor 17 is attached to the load-side bearing 12 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, in the temperature calculation unit 22 of the control device 19, if error between the transfer amount of heat passing through the inside of the load-side bearing 12 calculated in a course of calculation for the temperature T based on the thermal circuit network, and the heat transfer amount measured by the heat flux sensor 17, exceeds a threshold set in advance, or if the heat transfer direction differs between the calculated value and the measured value, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

In embodiment 26, the heat flux sensor 17 is provided at the load-side bearing 12. However, the heat flux sensor 17 may be provided at the non-load-side bearing 13.

Embodiment 27

Figure 29:
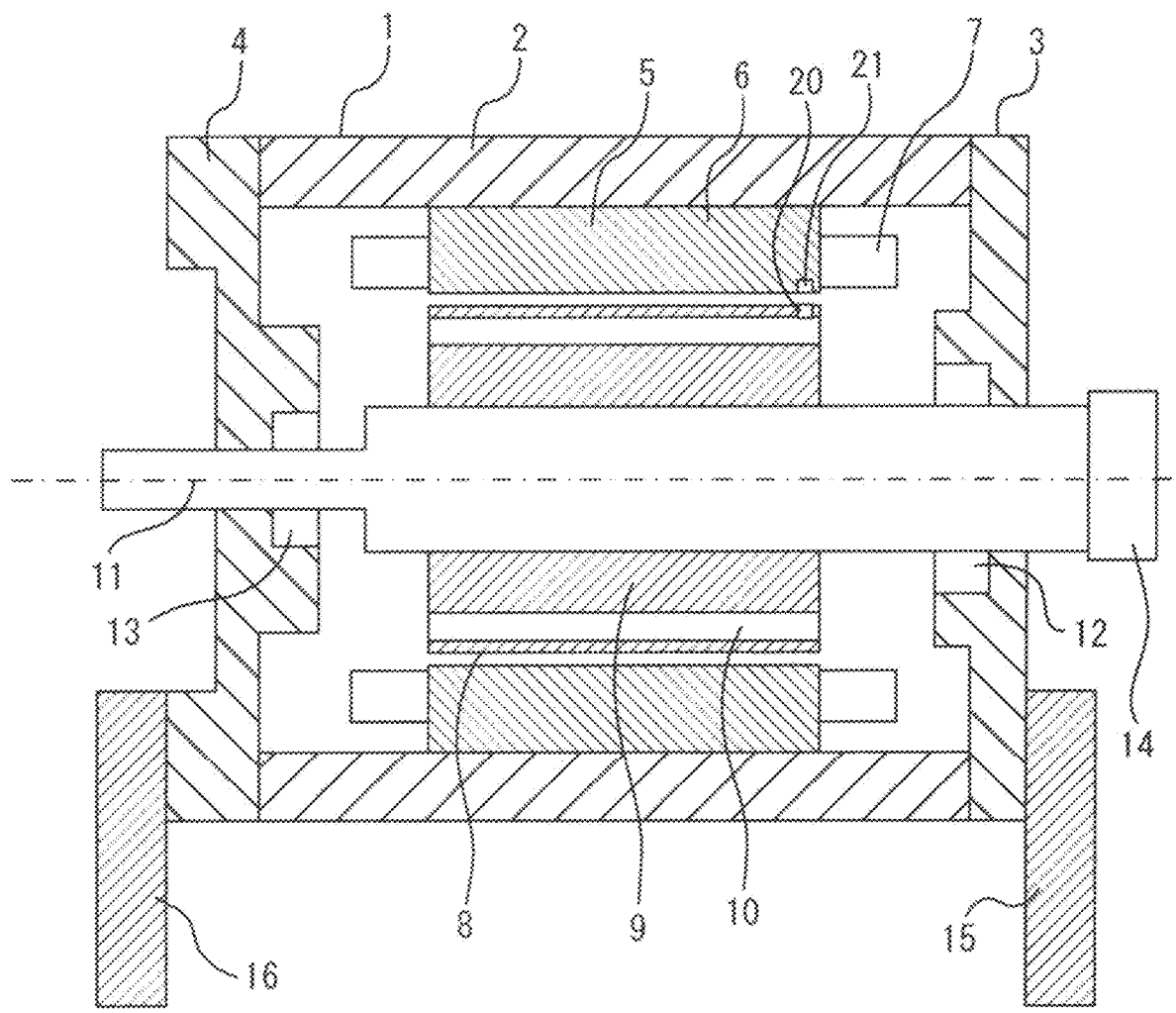
FIG. 29 is a sectional view showing a motor according to embodiment 27 of the present disclosure.

FIG. 29 is a sectional view showing a motor according to embodiment 27 of the present disclosure.

The thermocouples 20, 21 are respectively attached at the same positions in the axial direction (i.e., positions opposed to each other in the radial direction) at the outer circumferential surface of the rotor core 9 and the inner circumferential surface of the stator core 6 of the motor 1. The other configuration is the same as that in embodiment 1.

Operation of the motor device will be described. As in embodiment 1, when the motor 1 is being driven, in the thermal circuit network incorporated in the temperature calculation unit 22 of the control device 19, the temperature at each part of the motor 1 is calculated using Expression (1) on the basis of information about the generated loss (heat generation amount Q).

At this time, the heat transfer amount is calculated from a thermal resistance R27 calculated from a difference between the temperatures measured by the thermocouple 20 at the rotor core 9 and the thermocouple 21 at the stator core 6. In addition, the heat transfer direction is determined from the magnitude relationship between the temperatures measured by the respective thermocouples 20, 21.

In the temperature calculation unit 22 of the control device 19, if error between the transfer amount of heat passing between the rotor core 9 and the stator core 6 calculated in a course of calculation for the temperature T based on the thermal circuit network, and the heat transfer amount calculated from the temperature measurement values, exceeds a threshold set in advance, or if the heat transfer direction differs between both cases, one or more of the thermal resistance Rij, the heat capacity Ci, and the heat generation amount Qi are corrected so that the two heat transfer amounts and the two heat transfer directions respectively become the same, and thus the temperature Ti at each node i is calculated.

Thus, temperature estimation accuracy can be improved as compared to conventional art in which the temperature of a coil, a magnet, or the like is estimated from only temperature measurement values of some components. Further, owing to improvement in temperature estimation accuracy as described above, it becomes possible to reduce temperature margins taken into consideration in setting of the temperature thresholds when a current command is sent from the control device 19 to the inverter 18, and thus the limit of operation of the motor 1 can be expanded.

Although the disclosure is described above in terms of various exemplary embodiments, it should be understood that the various features, aspects, and functionality described in a plurality of the individual embodiments are not limited in their applicability to the particular embodiment with which they are described, but instead can be applied, alone or in various combinations to one or more of the embodiments of the disclosure.

For example, the above embodiments 1 to 27 each have shown the case of measuring the heat transfer amount and the heat transfer direction at one location, but depending on combination, the sensors may be provided at a plurality of locations to measure the heat transfer amounts. In addition, the heat flux sensor 17 and the two thermocouples 20, 21 may be used in combination.

Thus, it is understood that numerous modifications which have not been exemplified can be devised without departing from the scope of the present disclosure. Therefore, at least one of the constituent components may be modified, added, or eliminated, and at least one of the constituent components mentioned in at least one of the preferred embodiments may be selected and combined with the constituent components mentioned in another preferred embodiment.

DESCRIPTION OF THE REFERENCE CHARACTERS

- 1 motor
- 2 frame
- 3 load-side bracket
- 4 non-load-side bracket
- 5 stator
- 6 stator core
- 7 stator coil
- 8 rotor
- 9 rotor core
- 10 magnet
- 11 shaft
- 12 load-side bearing
- 13 non-load-side bearing
- 14 coupling
- 15 load-side flange
- 16 non-load-side flange
- 17 heat flux sensor
- 18 inverter
- 19 control device
- 20 thermocouple
- 21 thermocouple
- 100 processor
- 101 storage device

The invention claimed is:

1. A motor device comprising:
   a motor having a plurality of components including a stator and a rotor; and
   controlling circuitry to control the motor, wherein
   the motor is provided with a sensor to detect a heat transfer amount and a heat transfer direction with respect to the components composing the motor,
   the controlling circuitry includes a temperature calculator to calculate a temperature of each on the basis of a thermal circuit network from thermal resistances and heat capacities given with respect to the components, and
   on the basis of actual measured values of the heat transfer amount and the heat transfer direction obtained by the sensor, the temperature calculator corrects thermal resistances and heat capacities with respect to the components obtained on the basis of the thermal circuit network, and estimates the temperature of each component composing the motor.

2. The motor device according to claim 1, wherein
   the sensor comprises temperature sensors provided at a plurality of locations of the components, and
   the temperature calculator calculates the heat transfer amount and the heat transfer direction from a difference between temperatures detected by the plurality of temperature sensors and a magnitude relationship between the detected temperatures, corrects one or more of the thermal resistances and the heat capacities with respect to the components on the basis of the calculated heat transfer amount and the calculated heat transfer direction, and estimates the temperature of each component of the motor.

3. The motor device according to claim 2, wherein
   the temperature sensors are provided at a plurality of locations positioned as close to a contact surface between the components adjacent to each other as possible.

4. The motor device according to claim 2, wherein
   the temperature sensors are respectively provided at positions opposed to each other in a radial direction at an outer circumferential surface of a core of the rotor and an inner circumferential surface of a core of the stator.

5. The motor device according to claim 2, wherein
   the temperature sensors are provided at a plurality of locations inside a single one of the components.

6. The motor device according to claim 1, wherein
   the sensor comprises a heat flux sensor to measure the heat transfer amount and the heat transfer direction with respect to the components, and
   the temperature calculator corrects one or more of the thermal resistances and the heat capacities with respect to the components on the basis of the heat transfer amount and the heat transfer direction measured by the heat flux sensor, and estimates the temperature of each component of the motor.

7. The motor device according to claim 6, wherein
   the heat flux sensor is provided at a contact surface between the components adjacent to each other.

8. The motor device according to claim 6, wherein
   the heat flux sensor is provided inside a single one of the components.

* * * * *